(12) United States Patent
Hamada et al.

(10) Patent No.: US 12,024,043 B2
(45) Date of Patent: Jul. 2, 2024

(54) SERVER AND POWER MANAGEMENT METHOD

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 17/507,960

(22) Filed: Oct. 22, 2021

(65) Prior Publication Data

US 2022/0194250 A1 Jun. 23, 2022

(30) Foreign Application Priority Data

Dec. 22, 2020 (JP) .................................. 2020-212674

(51) Int. Cl.
 *B60L 53/62* (2019.01)
 *B60L 53/54* (2019.01)
 (Continued)

(52) U.S. Cl.
 CPC ............... *B60L 53/62* (2019.02); *B60L 53/54* (2019.02); *B60L 53/67* (2019.02); *G05B 19/042* (2013.01);
 (Continued)

(58) Field of Classification Search
 CPC .......... B60L 53/62; B60L 53/54; B60L 53/67; B60L 50/75; B60L 53/51; B60L 53/52; B60L 53/63; B60L 53/66; B60L 2240/622; B60L 2260/52; B60L 53/64; G05B 19/042; G05B 2219/2639; G06Q 10/06313; G06Q 20/0855; G06Q 30/0215; G06Q 50/06; H02J 3/32; H02J 3/381; H02J 2300/20;
 (Continued)

(56) References Cited

U.S. PATENT DOCUMENTS 10,432,632 B2 * 10/2019 Jin ....................... H04W 12/069
10,763,671 B2 * 9/2020 Fukunaga ............... H02J 13/00
(Continued)

FOREIGN PATENT DOCUMENTS

JP 5796041 B2 * 10/2015 ......... Y02B 70/3225
JP 2020-028198 A 2/2020

*Primary Examiner* — M Baye Diao
(74) *Attorney, Agent, or Firm* — Finnegan, Henderson, Farabow, Garrett & Dunner, LLP

(57) ABSTRACT

Before start of vehicle charging by using a power network, a first determination unit determines whether reserve of the power network is not less than a first reference value. When reserve of the power network is not less than the first reference value, a first permission unit permits supply of electric power from the power network to a vehicle. When reserve of the power network is smaller than the first reference value, a second determination unit determines whether or not electric power corresponding to charging power can be supplied to the power network by having at least one of power adjustment resources respond to vehicle charging. When the second determination unit determines that electric power can be supplied, a second permission unit permits supply of electric power from the power network to the vehicle.

12 Claims, 14 Drawing Sheets

(51) Int. Cl.
  *B60L 53/67* (2019.01)
  *G05B 19/042* (2006.01)
  *G06Q 10/0631* (2023.01)
  *G06Q 20/08* (2012.01)
  *G06Q 30/0207* (2023.01)
  *G06Q 50/06* (2024.01)
  *H02J 3/32* (2006.01)
  *H02J 3/38* (2006.01)

(52) U.S. Cl.
  CPC ... *G06Q 10/06313* (2013.01); *G06Q 20/0855* (2013.01); *G06Q 30/0215* (2013.01); *G06Q 50/06* (2013.01); *H02J 3/32* (2013.01); *H02J 3/381* (2013.01); *G05B 2219/2639* (2013.01); *H02J 2300/20* (2020.01); *H02J 2310/48* (2020.01)

(58) Field of Classification Search
  CPC .... H02J 2310/48; H02J 3/466; H02J 7/00712; H02J 15/008; H02J 2300/10; H02J 2300/24; H02J 2310/10; H02J 3/28; H02J 3/322; H02J 3/00; H02J 3/008; H02J 7/02; H02J 2203/10; Y02T 90/12
  USPC .......................................................... 320/104
  See application file for complete search history.

(56) References Cited

U.S. PATENT DOCUMENTS

| | | | |
|---|---|---|---|
| 2011/0204851 A1* | 8/2011 | Manotas, Jr. | B60L 55/00 |
| | | | 320/128 |
| 2015/0046222 A1* | 2/2015 | Ishii | G06Q 50/06 |
| | | | 705/7.31 |
| 2015/0255984 A1* | 9/2015 | Higashi | B60L 53/62 |
| | | | 700/297 |
| 2016/0207413 A1* | 7/2016 | Atluri | H02J 3/322 |
| 2018/0034271 A1* | 2/2018 | Lam | H02J 7/04 |

* cited by examiner

| DER | PRIORITY | INCENTIVE UNIT PRICE |
|---|---|---|
| ESS | A | D |
| FCS | A | D |
| GENERATOR | A | D |
| EVSE-BEV | C | B |
| EVSE-FCEV | D | A |
| HOUSE | B | C |
| COMMERCIAL FACILITY | B | C |
| FACTORY | B | C |

《SELECTION OF DER THAT TRANSMITS
ELECTRIC POWER IN RESPONSE TO CHARGING》

SERVER AND POWER MANAGEMENT METHOD

This nonprovisional application is based on Japanese Patent Application No. 2020-212674 filed with the Japan Patent Office on Dec. 22, 2020, the entire contents of which are hereby incorporated by reference.

BACKGROUND

Field

The present disclosure relates to a server that manages a plurality of power adjustment resources electrically connectable to a power network and a power management method.

Description of the Background Art

For example, Japanese Patent Laying-Open No. 2020-028198 discloses a method of managing supply and demand of a microgrid by using a plurality of power adjustment resources (specifically, a distributed power supply, a load, and an induction generator with a flywheel) electrically connectable to the microgrid.

SUMMARY

In the method described in Japanese Patent Laying-Open No. 2020-028198, normally, electric power is supplied from an external power network (specifically, a large-scale commercial power grid) to a microgrid, and when the external power network fails, balance in supply and demand of the microgrid is adjusted by turning off a load connected to the microgrid.

In a microgrid connected to a plurality of pieces of electric vehicle supply equipment (EVSE), a proportion of demand for charging occupied in total demand tends to be high. A vehicle including a power storage can have the power storage charged with electric power supplied from the microgrid through EVSE. Charging of the power storage carried out in the vehicle including the power storage by using the power network is also referred to as "vehicle charging" below. When vehicle charging is carried out simultaneously in a plurality of vehicles, demand for charging occupied in total demand of the microgrid is particularly high. Therefore, the microgrid may become unstable due to vehicle charging. Japanese Patent Laying-Open No. 2020-028198 does not discuss such a problem.

Instability of the power network due to vehicle charging may be suppressed by restriction of vehicle charging. When vehicle charging is restricted, however, convenience of a user of the vehicle who uses the power network is lowered.

The present disclosure was made to solve the problem above, and an object thereof is to achieve both of convenience of a user who uses a power network and adjustment of supply and demand of the power network in management of supply and demand of the power network.

A server according to the present disclosure is a server that manages a plurality of power adjustment resources electrically connectable to a power network, and includes a first determination unit, a second determination unit, a first permission unit, and a second permission unit. The first determination unit is configured to determine whether reserve of the power network is not less than a first reference value before a vehicle including a power storage starts charging of the power storage by using the power network. The first permission unit is configured to permit supply of electric power from the power network to the vehicle when the first determination unit determines that reserve of the power network is not less than the first reference value. The second determination unit is configured to determine whether electric power corresponding to charging power can be supplied to the power network by having at least one of the power adjustment resources respond to charging of the power storage when the first determination unit determines that reserve of the power network is smaller than the first reference value. The second permission unit is configured to permit supply of electric power from the power network to the vehicle when the second determination unit determines that electric power can be supplied.

In the server, before start of vehicle charging (that is, charging of the power storage carried out in the vehicle by using the power network), the second determination unit determines whether or not electric power corresponding to charging power can be supplied to the power network by having at least one power adjustment resource respond to vehicle charging. Then, when the second determination unit makes determination as YES (electric power can be supplied), the second permission unit permits supply of electric power from the power network to the vehicle. Permission by the second permission unit is also referred to as "second permission" below. When vehicle charging is started by second permission, electric power corresponding to charging power can be supplied to the power network by having at least one power adjustment resource respond to vehicle charging. Instability of the power network due to vehicle charging is thus suppressed.

On the other hand, start of vehicle charging may be delayed by waiting for second permission. Then, in the server, when reserve of the power network is sufficiently large (that is, reserve of the power network is not less than the first reference value), the first permission unit permits supply of electric power from the power network to the vehicle without waiting for second permission. Permission by the first permission unit is also referred to as "first permission" below. When reserve of the power network is sufficiently large, the user of the vehicle can carry out vehicle charging early based on first permission. According to the configuration, in management of supply and demand of the power network, convenience of the user who uses the power network and adjustment of supply and demand of the power network can both be achieved.

The server may further include a third permission unit. The third permission unit is configured to permit supply of electric power from the power network to the vehicle upon receiving a request for early charging from a terminal of a user of the vehicle before the vehicle starts charging of the power storage by using the power network.

In the server, in response to a request for early charging before start of vehicle charging, the third permission unit permits supply of electric power from the power network to the vehicle. Permission by the third permission unit is also referred to as "third permission" below. The user of the vehicle who desires early vehicle charging can carry out vehicle charging early based on third permission. According to the configuration, in management of supply and demand of the power network, convenience of the user who uses the power network and adjustment of supply and demand of the power network can both be achieved.

The terminal of the user of the vehicle may be registered in advance in the server in association with the user of the vehicle. The terminal of the user of the vehicle may be a terminal mounted on the vehicle or a portable terminal carried by the user of the vehicle.

The server may further include a fee manager that manages a fee for charging. The fee manager may be configured to set a fee for charging started by permission by the third permission unit to be higher than a fee for charging started by permission by each of the first permission unit and the second permission unit.

Vehicle charging started by first permission is also referred to as "first charging" below, vehicle charging started by second permission is also referred to as "second charging" below, and vehicle charging started by third permission is also referred to as "third charging" below. In the configuration above, by setting a fee for third charging to be higher than a fee for each of first charging and second charging, too high frequency of third charging can be suppressed. Instability of the power network due to third charging can thus be suppressed.

The server may further include a third determination unit and a prohibition unit. The third determination unit is configured to determine whether reserve of the power network is not less than a second reference value before the vehicle including the power storage starts charging of the power storage by using the power network. The prohibition unit is configured to prohibit supply of electric power from the power network to the vehicle when the third determination unit determines that reserve of the power network is smaller than the second reference value. The second reference value is smaller than the first reference value.

According to the configuration, when reserve of the power network is too small (that is, reserve of the power network is smaller than the second reference value), supply of electric power from the power network to the vehicle is prohibited. Instability of the power network due to insufficient reserve of the power network can thus be suppressed.

The server may further include a resource control unit. The resource control unit is configured to select at least one power adjustment resource from among the plurality of power adjustment resources when the second determination unit determines that electric power cannot be supplied and controls the selected power adjustment resource to be in a state responsive to charging of the power storage.

In the server, when the second determination unit makes determination as NO (electric power cannot be supplied), the resource control unit sets a power adjustment resource not in a responsive state to the responsive state, so that the second determination unit makes determination as YES (electric power can be supplied). The user of the vehicle can thus carry out vehicle charging by waiting until the power adjustment resource selected by the resource control unit (that is, the power adjustment resource that responds to vehicle charging) is in the responsive state.

The plurality of power adjustment resources may include a stationary power storage and a fuel cell electric vehicle. The resource control unit may be configured to preferentially select the stationary power storage over the fuel cell electric vehicle.

The fuel cell electric vehicle is poorer in energy efficiency in electric power adjustment than the stationary power storage. In the configuration, the stationary power storage is preferentially selected to be able to adjust supply and demand of the power network at high energy efficiency.

The server may further include an incentive manager that manages an incentive given to a user of a power adjustment resource that has made power adjustment of the power network. The incentive manager may be configured to set an incentive for power adjustment by using the fuel cell electric vehicle to be higher than an incentive for power adjustment by using the stationary power storage.

When the resource control unit selects a fuel cell electric vehicle low in priority, the power adjustment resource tends to be insufficient. Then, in the server, an incentive for power adjustment by using the fuel cell electric vehicle is set to be relatively high to promote power adjustment by using the fuel cell electric vehicle. Instability of the power network due to vehicle charging is thus suppressed.

The server may further include a charging control unit. The charging control unit is configured to start charging of the power storage when the power network and the vehicle are electrically connected to each other while supply of electric power from the power network to the vehicle is permitted and to control charging power for the power storage during charging.

According to the configuration, a server side can carry out charging control in vehicle charging. The server can suppress instability of the power network due to vehicle charging by adjusting charging power. In the configuration above, when the power network and the vehicle are electrically connected to each other while supply of electric power from the power network to the vehicle is permitted, vehicle charging is immediately started. Convenience of the user of the vehicle is thus improved.

The charging control unit may control charging power by remotely controlling at least one of the vehicle and EVSE.

The charging control unit may be configured to carry out control of rise of charging power for the power storage in accordance with responsiveness of the power adjustment resource that responds to charging of the power storage. According to such a configuration, rise characteristics of charging power in vehicle charging can be varied in accordance with responsiveness of the power adjustment resource that responds to vehicle charging. For example, when responsiveness of the power adjustment resource is low, the charging control unit may set a gradient of rise of charging power in vehicle charging to be gentle. When responsiveness of the power adjustment resource is high, the charging control unit may set the gradient of rise of charging power in vehicle charging to be steep.

The first determination unit may be configured to determine whether reserve of the power network is not less than the first reference value when it receives a charging request from a terminal of a user of the vehicle. According to such a configuration, the first determination unit tends to make previously-described determination at appropriate timing before start of charging.

The server may further include a vehicle manager that manages information on the vehicle. The information managed by the vehicle manager may include at least one of a position of the vehicle and remaining power in the power storage. The first determination unit may be configured to predict charging start timing based on at least one of the position of the vehicle and the remaining power in the power storage. As charging start timing is thus predicted, the first determination unit tends to make previously-described determination at appropriate timing before start of charging.

A power management method according to the present disclosure is a method of managing supply and demand of a power network by using a plurality of power adjustment resources electrically connectable to the power network. The power management method includes making first determination, giving first permission, making second determination, and giving second permission. In the first determination, whether reserve of the power network is not less than a first reference value is determined before a vehicle including a power storage starts charging of the power storage by using the power network. In the first permission, when it is determined in the first determination that reserve of the power network is not less than the first reference value, supply of electric power from the power network to the vehicle is permitted. In the second determination, when it is determined in the first determination that reserve of the power network is smaller than the first reference value, whether electric power corresponding to charging power can be supplied to the power network by having at least one of the power adjustment resources respond to charging of the power storage is determined. In the second permission, when it is determined in the second determination that electric power can be supplied, supply of electric power from the power network to the vehicle is permitted.

According to the power management method as well, similarly to the server described previously, in management of supply and demand of the power network, convenience of the user who uses the power network and adjustment of supply and demand of the power network can both be achieved.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram showing exemplary DER selection information used in the server shown in FIG. 2.

DESCRIPTION OF THE PREFERRED EMBODIMENTS

Figure 1:
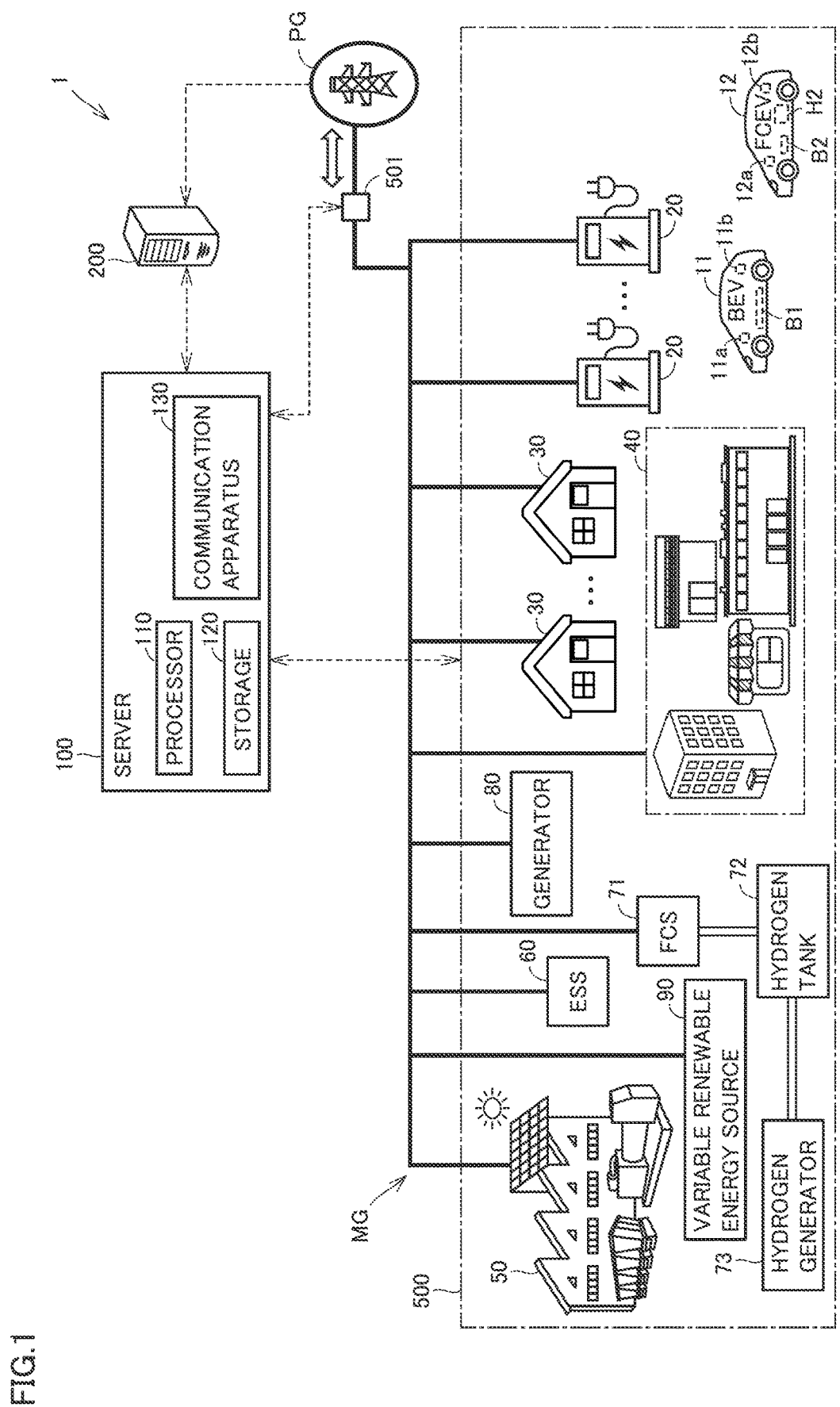
FIG. 1 is a diagram showing a schematic configuration of an electric power system according to an embodiment of the present disclosure.

An embodiment of the present disclosure will be described in detail with reference to the drawings. The same or corresponding elements in the drawings have the same reference characters allotted and description thereof will not be repeated. An energy management system is denoted as "EMS" below. A distributed energy resource is denoted as "DER".

FIG. 1 is a diagram showing a schematic configuration of an electric power system according to an embodiment of the present disclosure. Referring to FIG. 1, an electric power system 1 includes a power grid PG, a microgrid MG, servers 100 and 200, a DER group 500, and a power reception and transformation facility 501.

Server 100 is a computer that manages supply and demand of microgrid MG. Server 100 belongs to a manager of microgrid MG. Server 100 corresponds to a community EMS (CEMS) server. Microgrid MG is a power network that supplies electric power to one city (for example, a smart city) as a whole. A power line for networking a plurality of DERs in microgrid MG may be a private power line. Microgrid MG is configured to be connected to and disconnected from power grid PG. Microgrid MG corresponds to an exemplary "power network" according to the present disclosure.

Power reception and transformation facility 501 is provided at a point of interconnection (a power reception point) of microgrid MG and configured to switch between parallel in (connection) and parallel off (disconnection) between power grid PG and microgrid MG. When microgrid MG is performing a grid-connected operation as being connected to power grid PG, power reception and transformation facility 501 receives alternating-current (AC) power from power grid PG, down-converts received electric power, and supplies down-converted electric power to microgrid MG. While microgrid MG is performing an isolated operation as being disconnected from power grid PG, electric power is not supplied from power grid PG to microgrid MG. Power reception and transformation facility 501 includes a switch on a high voltage side (a primary side) (for example, a section switch, an isolator, a breaker, and a load break switch), a transformer, a protection relay, a measurement instrument, and a controller. Server 100 is configured to receive information (for example, a power waveform) on microgrid MG from power reception and transformation facility 501 and to indicate parallel in/parallel off to power reception and transformation facility 501. In this embodiment, microgrid MG is basically maintained to perform the isolated operation. Server 100 monitors a state of microgrid MG (for example, quality of electric power), and when the server determines that the microgrid is unable to maintain the isolated operation, the server makes switching to the grid-connected operation.

Server 200 is a computer that manages supply and demand of power grid PG. Power grid PG is a power network constructed by a power plant and a power transmission and distribution (T&D) facility that are not shown. The electric power company corresponds to a general power T&D utility and maintains and manages power grid PG (commercial power grid). The electric power company corresponds to a manager of power grid PG. Server 200 belongs to the electric power company.

Server 100 is configured to communicate with each of server 200 and DER group 500. A protocol of communication may be OpenADR. DER group 500 includes a plurality of DERs electrically connectable to microgrid MG. Server 100 is configured to manage the plurality of DERs included in DER group 500. Server 100 may carry out demand response (DR) on DER group 500 when it is requested by server 200 to adjust supply and demand of power grid PG. Alternatively, server 100 may carry out DR on DER group 500 in response to a request from a supply and demand adjustment market. Alternatively, server 100 may carry out DR on DER group 500 in order to adjust supply and demand of microgrid MG.

The plurality of DERs included in DER group 500 are electrically connected to one another through microgrid MG. DER group 500 includes electric vehicle supply equipment (EVSE) 20, a house 30, a commercial facility 40, a factory 50, an energy storage system (ESS) 60, a fuel cell system (FCS) 71, a generator 80, and a variable renewable energy source 90. Each of these may function as a DER. DER group 500 further includes a battery electric vehicle (BEV) 11 and a fuel cell electric vehicle (FCEV) 12. EVSE 20 functions as the DER as being electrically connected to a vehicle (for example, BEV 11 or FCEV 12). For example, as a charging connector of EVSE 20 is inserted (plugged) into an inlet of the vehicle, EVSE 20 and the vehicle are electrically connected to each other. Though FIG. 1 shows only a single BEV 11 and only a single FCEV 12, any number of vehicles may be included in DER group 500. Ten or more or one hundred or more vehicles may be included. DER group 500 may include a personally owned vehicle (POV) or a mobility as a service (MaaS) vehicle. The MaaS vehicle is a vehicle managed by a MaaS entity. Any number of pieces of EVSE 20, houses 30, commercial facilities 40, factories 50, ESSs 60, FCSs 71, generators 80, and variable renewable energy sources 90 may also be included in DER group 500.

BEV 11 includes a power storage B1. Electric power stored in power storage B1 is used for driving a motor (not shown) for travel of BEV 11 or consumed in equipment mounted on BEV 11. FCEV 12 includes a power generation device H2 and a power storage B2. Power generation device H2 includes a hydrogen tank in which hydrogen is retained and a fuel cell that generates electric power by chemical reaction between hydrogen and oxygen (neither of which is shown). The fuel cell generates electric power by using hydrogen supplied from the hydrogen tank. Electric power generated by power generation device H2 is used for driving a motor (not shown) for travel of FCEV 12, consumed in equipment mounted on FCEV 12, or stored in power storage B2. A user of FCEV 12 can add hydrogen at a hydrogen station (not shown) provided in the city. BEV 11 and FCEV 12 include electronic control units (ECUs) 11a and 12a and communication apparatuses 11b and 12b for wireless communication with server 100, respectively.

DER group 500 includes a plurality of pieces of EVSE 20 (for example, a charging infrastructure constructed in the city). EVSE 20 is public EVSE that can be used by a user of a vehicle after prescribed authentication. An authentication method may be authentication by a charging card or authentication by communication (for example, Plug and Charge). Microgrid MG and each piece of EVSE 20 are connected to each other to supply and receive electric power therebetween. Server 100 and each piece of EVSE 20 are configured to communicate with each other (for example, wired communication). Server 100 can identify a user who uses EVSE 20 by authentication above. Server 100 may establish through EVSE 20, wired communication with BEV 11 or FCEV 12 connected to EVSE 20.

DER group 500 includes a plurality of houses 30 (for example, houses of people who live in the city). House 30 includes various home electrical appliances (for example, a lighting device, an air-conditioning facility, kitchen equipment, information equipment, a television, a refrigerator, and a washing machine). House 30 may include at least one of a charger-discharger (for example, home EVSE), a variable renewable energy source (for example, a photovoltaic panel provided on a roof), an ESS, an FCS, and a cogeneration system (for example, a water heater or a heat pump water heater that uses heat generated in self-generation). Supply and demand of energy in house 30 is managed, for example, by a not-shown home EMS (HEMS). Microgrid MG and each house 30 are connected to each other to supply and receive electric power therebetween. Server 100 and each house 30 are configured to communicate with each other (for example, wired communication). In this embodiment, server 100 and each house 30 communicate with each other through the HEMS.

Commercial facility 40 includes, for example, office buildings and stores. Examples of the stores include department stores, shopping centers, supermarkets, or convenience stores. Supply and demand of energy in each facility included in commercial facility 40 is managed, for example, by a not-shown building EMS (BEMS). The BEMS may manage supply and demand of energy individually for each facility or may collectively manage supply and demand of energy in a plurality of facilities. Each facility included in commercial facilities 40 and microgrid MG are connected to each other to supply and receive electric power therebetween. In this embodiment, server 100 communicates with commercial facility 40 through the BEMS.

Factory 50 may be, for example, a car factory or another factory. Factory 50 includes, for example, a production line and a concentrated heat source for air-conditioning. Factory 50 may include at least one of a variable renewable energy source (for example, a photovoltaic power generation facility or a wind power generation facility), a generator (for example, a gas turbine generator or a diesel generator), and a cogeneration system. Supply and demand of energy in factory 50 is managed, for example, by a not-shown factory EMS (FEMS). Microgrid MG and factory 50 are connected to each other to supply and receive electric power therebetween. Server 100 and factory 50 are configured to communicate with each other (for example, wired communication). In this embodiment, server 100 and factory 50 communicate with each other through the FEMS.

ESS 60 is a stationary power storage configured to be chargeable from and dischargeable to microgrid MG. For example, a lithium ion battery, a lead-acid battery, a nickel metal hydride battery, a redox flow battery, or a sodium sulfur (NAS) battery may be adopted as ESS 60. Surplus electric power generated by variable renewable energy source 900 may be stored in ESS 60.

FCS 71 includes a stationary fuel cell that generates electric power by chemical reaction between hydrogen and oxygen. FCS 71 is connected to a hydrogen tank 72 that is connected to a hydrogen generator 73. FCS 71 is configured to generate electric power by using hydrogen supplied from hydrogen tank 72 and to supply generated electric power to microgrid MG. Hydrogen generator 73 generates hydrogen and supplies generated hydrogen to hydrogen tank 72. Any method can be adopted as a hydrogen generation method.

For example, such a known method as a by-product hydrogen method, water electrolysis, a fossil fuel reforming method, a biomass reforming method, or an iodine-sulfur (IS) process may be adopted for hydrogen generator 73. Hydrogen generator 73 may generate hydrogen by using electric power supplied from microgrid MG or by using surplus electric power generated by variable renewable energy source 90. Server 100 may control hydrogen generator 73 such that a remaining amount of hydrogen in hydrogen tank 72 is not smaller than a prescribed value.

Generator 80 is a stationary generator that generates electric power by using fossil fuel. Generator 80 may be, for example, a gas turbine generator or a diesel generator. Generator 80 may be used as an emergency power supply.

Variable renewable energy source 90 is a power supply that varies in generated power output depending on a weather condition, and it provides generated electric power to microgrid MG. Electric power generated by variable renewable energy source 90 corresponds to variable renewable energy (VRE). Variable renewable energy source 90 includes, for example, a photovoltaic power generation facility and a wind power generation facility.

Server 100 includes a processor 110, a storage 120, and a communication apparatus 130. Processor 110 may be implemented by a central processing unit (CPU). Storage 120 is configured to store various types of information. Storage 120 stores not only a program executed by processor 110 but also information (for example, a map, a mathematical expression, and various parameters) to be used by a program. Communication apparatus 130 includes various communication interfaces (I/Fs). Server 100 is configured to communicate with the outside through communication apparatus 130.

Server 100 controls DER group 500 connected to microgrid MG to function as a virtual power plant (VPP). More specifically, server 100 remotely controls DER group 500 as being integrated as if the DERs functioned as a single power plant according to an energy management technology that makes use of the Internet of Things (IoT). Each DER included in DER group 500 corresponds to an exemplary "power adjustment resource" according to the present disclosure.

Figure 2:
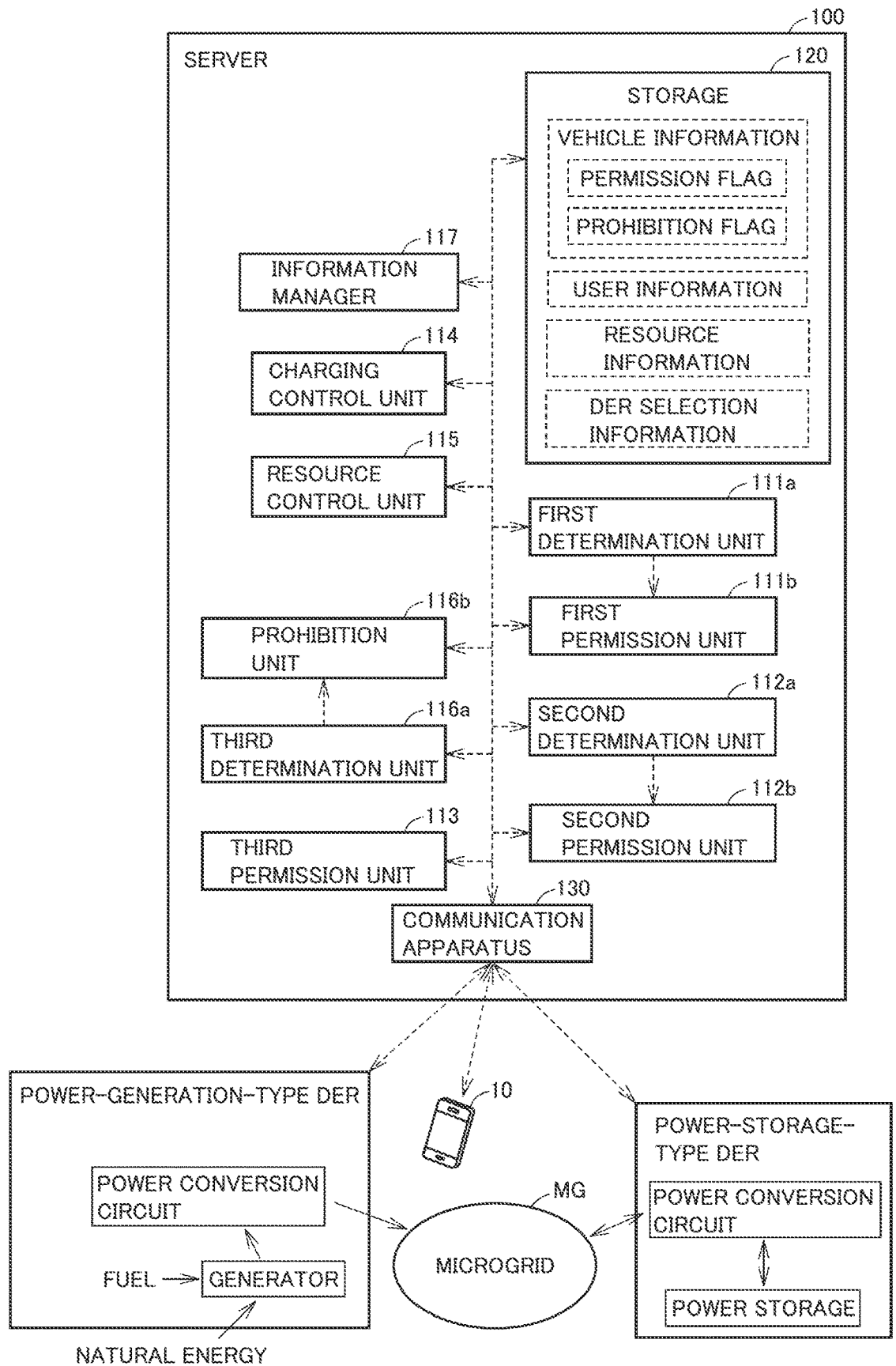
FIG. 2 is a functional block diagram showing a component of a server for each function according to the embodiment of the present disclosure.

FIG. 2 is a functional block diagram showing a component of server 100 for each function. Referring to FIG. 2 together with FIG. 1, server 100 includes a first determination unit 111a, a first permission unit 111b, a second determination unit 112a, a second permission unit 112b, a third permission unit 113, a charging control unit 114, a resource control unit 115, a third determination unit 116a, a prohibition unit 116b, and an information manager 117. Each unit is implemented, for example, by processor 110 shown in FIG. 1 and a program in storage 120 executed by processor 110. Without being limited as such, each unit may be implemented by dedicated hardware (electronic circuitry). Server 100 according to this embodiment corresponds to an exemplary "server" according to the present disclosure.

Server 100 is configured to communicate with each of a portable terminal 10 and a DER through communication apparatus 130.

A user of each vehicle (including BEV 11 and FCEV 12) carries portable terminal 10. Though FIG. 2 shows only a single portable terminal 10, portable terminal 10 is carried by a user of each vehicle. In this embodiment, a smartphone equipped with a touch panel display is adopted as portable terminal 10. Without being limited thereto, any portable terminal can be adopted as portable terminal 10, and a tablet terminal, a wearable device (for example, a smart watch), an electronic key, or the like can also be adopted. Prescribed application software (which is simply referred to as an "application" below) is installed in portable terminal 10. Portable terminal 10 is configured to exchange information with server 100 through the application. The user can transmit a charging request which will be described later and an action schedule of the vehicle to server 100 by operating portable terminal 10. Examples of the action schedule of the vehicle include a drive plan (for example, time of departure, a destination, and time of arrival) of a POV or a drive plan of a MaaS vehicle. Portable terminal 10 corresponds to an exemplary "terminal of a user of a vehicle" according to the present disclosure.

Information manager 117 is configured to manage information on each user (which is also referred to as "user information" below) registered in server 100, information on each vehicle (which is also referred to as "vehicle information" below) registered in server 100, and information on each stationary DER (which is also referred to as "resource information" below) registered in server 100. The user information, the vehicle information, and the resource information are stored in storage 120 as being distinguished for each user, for each vehicle, or for each DER based on identification information (ID). Information manager 117 according to this embodiment functions as a "vehicle manager," a "fee manager," and an "incentive manager" according to the present disclosure.

A user of a vehicle (for example, BEV 11) registered in server 100 can charge a vehicle-mounted battery (for example, power storage B1) with electric power supplied from microgrid MG, by connecting the vehicle to EVSE 20. Each vehicle registered in server 100 can function as a DER by being connected to EVSE 20.

The vehicle information includes vehicle specs (for example, a capacity and charging and discharging performance of the power storage), a position of a vehicle, remaining power (for example, a state of charge (SOC)) of a vehicle-mounted battery, an action schedule, a permission flag, and a prohibition flag.

The state (for example, a position and an SOC) of the vehicle is obtained by various sensors mounted on each vehicle and transmitted from each vehicle to server 100. Each vehicle may sequentially transmit a recent state of the vehicle every prescribed cycle or may collectively transmit accumulated data (states of the vehicle) at prescribed timing (for example, at the time of end of travel or at the time of connection of the charging connector). The action schedule is transmitted from portable terminal 10 to server 100. Server 100 may predict the action schedule of the vehicle based on history data of the vehicle. The permission flag is a parameter representing whether or not to permit charging in the vehicle and it is stored in advance in storage 120.

The permission flag set to ON means that charging in the vehicle is permitted. The permission flag set to OFF means that charging in the vehicle is not permitted. A value (ON/OFF) of the permission flag is changed by each of first permission unit 111b, second permission unit 112b, and third permission unit 113 which will be described later.

A value (ON/OFF) of the prohibition flag is changed by prohibition unit 116b which will be described later. The prohibition flag set to ON means that charging in the vehicle is prohibited by prohibition unit 116b. The prohibition flag set to OFF means that charging in the vehicle is not prohibited by prohibition unit 116b. When the prohibition flag is ON, charging in the vehicle is prohibited even though the permission flag is set to ON.

EVSE 20, house 30, commercial facility 40, factory 50, ESS 60, FCS 71, generator 80, and variable renewable energy source 90 are registered in server 100 as stationary DERs. The resource information includes a position, a state, and specs (for example, maximum output, a capacity, and responsiveness) of each stationary DER. For example, the state of EVSE 20 includes whether or not a vehicle is connected thereto. The state of EVSE 20 to which BEV 11 is connected includes a state (for example, an active or inactive state of ECU 11a, an SOC of power storage B1, and charging and discharging power of power storage B1) of that BEV 11. The state of EVSE 20 to which FCEV 12 is connected includes a state (for example, an active or inactive state of ECU 12a, a remaining amount of hydrogen in power generation device H2, electric power generated by power generation device H2 and reserve power generation capacity of power generation device H2, an SOC of power storage B2, and charging and discharging power of power storage B2) of that FCEV 12. The state of each of house 30, commercial facility 40, and factory 50 includes consumed power. The state of ESS 60 includes an active or inactive state of a control system, an SOC, and charging and discharging power. The state of each of FCS 71 and generator 80 includes an active or inactive state of the control system, generated electric power, and reserve power generation capacity. The state of FCS 71 further includes the remaining amount of hydrogen in hydrogen tank 72. The state of variable renewable energy source 90 includes generated electric power. Server 100 can obtain the resource information by communicating with each stationary DER.

The user information includes a communication address of portable terminal 10 carried by a user, a vehicle ID of a vehicle belonging to the user, a resource ID of a stationary DER belonging to the user, an electricity fee (including a charge fee), and incentive information (for example, an amount of acquired incentive).

Each user registered in server 100 has signed a contract for using electric power of microgrid MG with a manager of microgrid MG (which is also referred to as an "MG manager" below). Under this contract, a user (demand side) who uses electric power supplied from microgrid MG is obliged to pay a prescribed electricity fee to the MG manager.

For example, a user of a vehicle who has charged the vehicle-mounted battery with electric power supplied from microgrid MG is obliged to pay a charge fee to the MG manager. Information manager 117 calculates a charge fee (an electricity fee for charging) based on a prescribed charge fee unit price. Any charge fee unit price is determined in the contract. The charge fee unit price may be a unit price for the number of times of charging, a unit price for an amount of charged electric power, or a unit price for a time period of charging. Though details will be described later, information manager 117 varies the charge fee unit price depending on a type of charging.

A DER user who has made power adjustment of microgrid MG in response to a request (for example, DR) from the MG manager obtains the right to receive an incentive determined in advance in the contract from the MG manager. Information manager 117 manages the incentive to be given to the DER user who has made power adjustment of microgrid MG. The incentive may be paid with a general currency or a virtual currency that can be used only in the city. Information manager 117 calculates the amount of acquired incentive for each user based on a prescribed incentive unit price. Though details will be described later, information manager 117 varies the incentive unit price depending on a type of the DER. Any incentive unit price is determined in the contract. The incentive unit price may be a unit price for the number of times of electric power adjustment, a unit price for an amount of electric power that has been adjusted, or a unit price for a time period of electric power adjustment.

First determination unit 111a is configured to determine whether reserve of microgrid MG is not less than a first reference value (which is denoted as "Th1" below) before one vehicle registered in server 100 starts charging of a vehicle-mounted battery by using microgrid MG. Reserve of microgrid MG is also referred to as "MG reserve" below.

In this embodiment, before start of charging, the user of the vehicle transmits a charging request to server 100 through portable terminal 10. The charging request is categorized into a request for ordinary charging and a request for early charging. The user of the vehicle can select any of the request for ordinary charging and the request for early charging and transmit the selected request to server 100. The charging request is transmitted together with an ID of portable terminal 10 (terminal ID). The terminal ID functions also as the user ID. Server 100 can identify a vehicle belonging to the user who has transmitted the charging request based on the terminal ID, by referring to the user information. A vehicle belonging to the user who has transmitted the charging request to server 100 is also referred to as a "subject vehicle" below. Charging of the power storage included in the subject vehicle is also referred to as "subject charging." The subject vehicle should only be a vehicle including a power storage chargeable by EVSE 20, and it may be BEV 11 shown in FIG. 1 or a not-shown vehicle. Subject charging is carried out with electric power supplied from microgrid MG to the subject vehicle. In this embodiment, when server 100 receives the charging request, first determination unit 111a makes determination described previously.

When first determination unit 111a makes determination as YES (MG reserve ≥ Th1), first permission unit 111b sets the permission flag of the subject vehicle to ON. Thus, supply of electric power from microgrid MG to the subject vehicle is permitted. Setting of the permission flag to ON by first permission unit 111b corresponds to first permission. Charging started by first permission corresponds to first charging.

Second determination unit 112a is configured to determine whether or not electric power corresponding to charging power can be supplied from DER group 500 to microgrid MG by having at least one DER included in DER group 500 respond to subject charging when first determination unit 111a makes determination as NO (MG reserve <Th1). More specifically, second determination unit 112a uses the resource information to check whether or not each DER can respond within a prescribed response time period (for example, within one second from a command). When electric power corresponding to charging power can be secured by the DER that can respond, second determination unit 112a makes determination as YES (electric power can be supplied), and when electric power corresponding to charging power cannot be secured by the DER that can respond, it makes determination as NO (electric power cannot be supplied).

When second determination unit 112a makes determination as YES (electric power can be supplied), second permission unit 112b sets the permission flag of the subject vehicle to ON. Supply of electric power from microgrid MG to the subject vehicle is thus permitted. Setting of the permission flag to ON by second permission unit 112b corresponds to second permission. Charging started by second permission corresponds to second charging.

Third permission unit 113 sets the permission flag of the subject vehicle to ON when it receives a request for early charging from the user of the vehicle before the subject vehicle starts charging by using microgrid MG. Supply of electric power from microgrid MG to the subject vehicle is thus permitted. Setting of the permission flag to ON by third permission unit 113 corresponds to third permission. Charging started by third permission corresponds to third charging (early charging).

Information manager 117 sets an electricity fee for third charging (early charging) to be higher than an electricity fee for each of first charging and second charging. Though details will be described later, information manager 117 sets a unit price of the charge fee for third charging to be higher than a unit price of the charge fee for each of first charging and second charging (see S52 in FIG. 9 which will be described later).

Third determination unit 116a is configured to determine whether MG reserve is not less than a second reference value (which is denoted as "Th2" below) before the subject vehicle starts charging by using microgrid MG. Th2 is smaller than Th1 (Th2<Th1). When third determination unit 116a makes determination as NO (MG reserve <Th2), prohibition unit 116b sets the prohibition flag of the subject vehicle to ON. Supply of electric power from microgrid MG to the subject vehicle is thus prohibited.

When the charging connector of EVSE 20 is inserted into the inlet of the subject vehicle while supply of electric power from microgrid MG to the subject vehicle is permitted, charging control unit 114 starts subject charging. In other words, while the permission flag of the subject vehicle is ON before plug-in, charging immediately after plug-in (charging immediately started by plug-in) can be carried out. Charging control unit 114 controls charging power during charging. Though details will be described later, charging control unit 114 controls rise of charging power based on responsiveness of a DER that responds to subject charging (see FIG. 10 which will be described later).

When second determination unit 112a makes determination as NO (electric power cannot be supplied), resource control unit 115 selects at least one DER from DER group 500 and controls the selected DER to be in a state responsive to subject charging. For example, when the control system of the selected DER is inactive, resource control unit 115 sets the DER to a stand-by state (that is, the state responsive to subject charging) by starting up the control system of the DER. When the control system of the selected DER is active, resource control unit 115 may request the EMS to set the DER to the responsive state. Resource control unit 115 may receive a notification that the DER is in the stand-by state from the EMS. Control for setting the DER to the stand-by state is also referred to as "DER stand-by control" below.

Resource control unit 115 selects a DER in accordance with prescribed priority. Prior to selection of a DER, resource control unit 115 may exclude a DER not suitable for electric power adjustment from selection candidates. Resource control unit 115 may exclude, for example, a DER that is not set to the stand-by state within a prescribed time period from selection candidates. The user of the DER that has made power adjustment can receive the incentive from the MG manager. Information manager 117 varies the unit price of the incentive for electric power adjustment depending on a type of the selected DER. The priority and the unit price of the incentive for each DER included in DER group 500 are shown, for example, in DER selection information stored in advance in storage 120. FIG. 3 is a diagram showing exemplary DER selection information.

Referring to FIG. 3, this DER selection information categorizes DERs into eight categories (ESS/FCS/stationary generator/EVSE-BEV/EVSE-FCEV/house/commercial facility/factory), and determines priority and the incentive unit price for each category. In FIG. 3, "EVSE-BEV" and "EVSE-FCEV" represent a BEV and an FCEV connected to EVSE, respectively. Each of the priority and the incentive unit price shown in FIG. 3 is shown in the descending order of A, B, C, and D.

As shown in FIG. 3, the priority of the ESS (stationary power storage) is higher than the priority of the FCEV (fuel cell electric vehicle). Resource control unit 115 selects a DER in accordance with the priority shown in DER selection information. Resource control unit 115 is thus configured to preferentially select the ESS over the FCEV. As the ESS is preferentially selected, energy loss (natural discharging) when the ESS is left stand is suppressed. Further priority may be placed on a plurality of DERs belonging to the same category based on prescribed criteria. For example, the priority of a DER high in specs may be high. A DER the control system of which is active may be higher in priority than a DER the control system of which is inactive.

As shown in FIG. 3, the unit price of the incentive for the FCEV is higher than the unit price of the incentive for the ESS. Information manager 117 determines the incentive unit price by referring to the DER selection information shown in FIG. 3. Information manager 117 is thus configured to set the incentive for electric power adjustment by using the FCEV to be higher than the incentive for electric power adjustment by using the ESS. By setting the incentive for the FCEV to be higher, cooperation by the FCEV at the time when the resource is insufficient is more readily obtained.

Referring again to FIG. 2 together with FIG. 1, each DER included in DER group 500 is categorized into a power-generation-type DER, a power-storage-type DER, and a load-type DER.

In the power-generation-type DER, the generator generates electric power with natural energy (for example, solar rays or wind power) or fuel (for example, light oil, natural gas, or hydrogen) and generated electric power is provided to microgrid MG through a power conversion circuit. In the power-storage-type DER, electric power is exchanged between the power storage and microgrid MG through the power conversion circuit. The power conversion circuit in each DER is configured to operate in accordance with a control signal from server 100 and to carry out prescribed power conversion. The power conversion circuit may include at least one of an inverter and a converter. The power conversion circuit may include a relay that switches between connection and disconnection between a DER and microgrid MG.

For example, in DER group 500 shown in FIG. 1, ESS 60 functions as the power-storage-type DER. Each of FCS 71, generator 80, and variable renewable energy source 90 functions as the power-generation-type DER. Though electric power generated by variable renewable energy source 90 is basically determined by a weather condition, power generation output of variable renewable energy source 90 can be restricted.

BEV 11 functions as the power-storage-type DER. BEV 11 functions as the power-storage-type DER by carrying out charging and discharging of power storage B1 connected to microgrid MG. FCEV 12 functions as the power-generation-type DER FCEV 12 functions as the power-generation-type DER by providing electric power generated by power generation device H2 to microgrid MG. FCEV 12 may be configured to function as the power-storage-type DER. When the capacity and charging and discharging performance of power storage B2 are sufficient, FCEV 12 can function also as the power-storage-type DER. The power conversion circuit may be mounted on a vehicle (BEV 11 or FCEV 12) or on EVSE 20. For example, direct-current (DC) power may be provided from the vehicle to EVSE 20 of the DC type and the inverter contained in EVSE 20 may carry out DC/AC conversion. The vehicle-mounted inverter may carry out DC/AC conversion on electric power discharged from the power storage included in the vehicle and resultant AC power may be provided from the vehicle to EVSE of the AC type.

Though not shown in FIG. 2, an electrical appliance that consumes electric power of microgrid MG can also function as the DER (the load-type DER). As electrical load of the electrical appliance connected to microgrid MG is higher, an amount of power consumption in microgrid MG is larger. For example, a demand side of each of house 30, commercial facility 40, and factory 50 shown in FIG. 1 can adjust supply and demand of microgrid MG by adjusting the electrical load of the electrical appliance.

Figure 4:
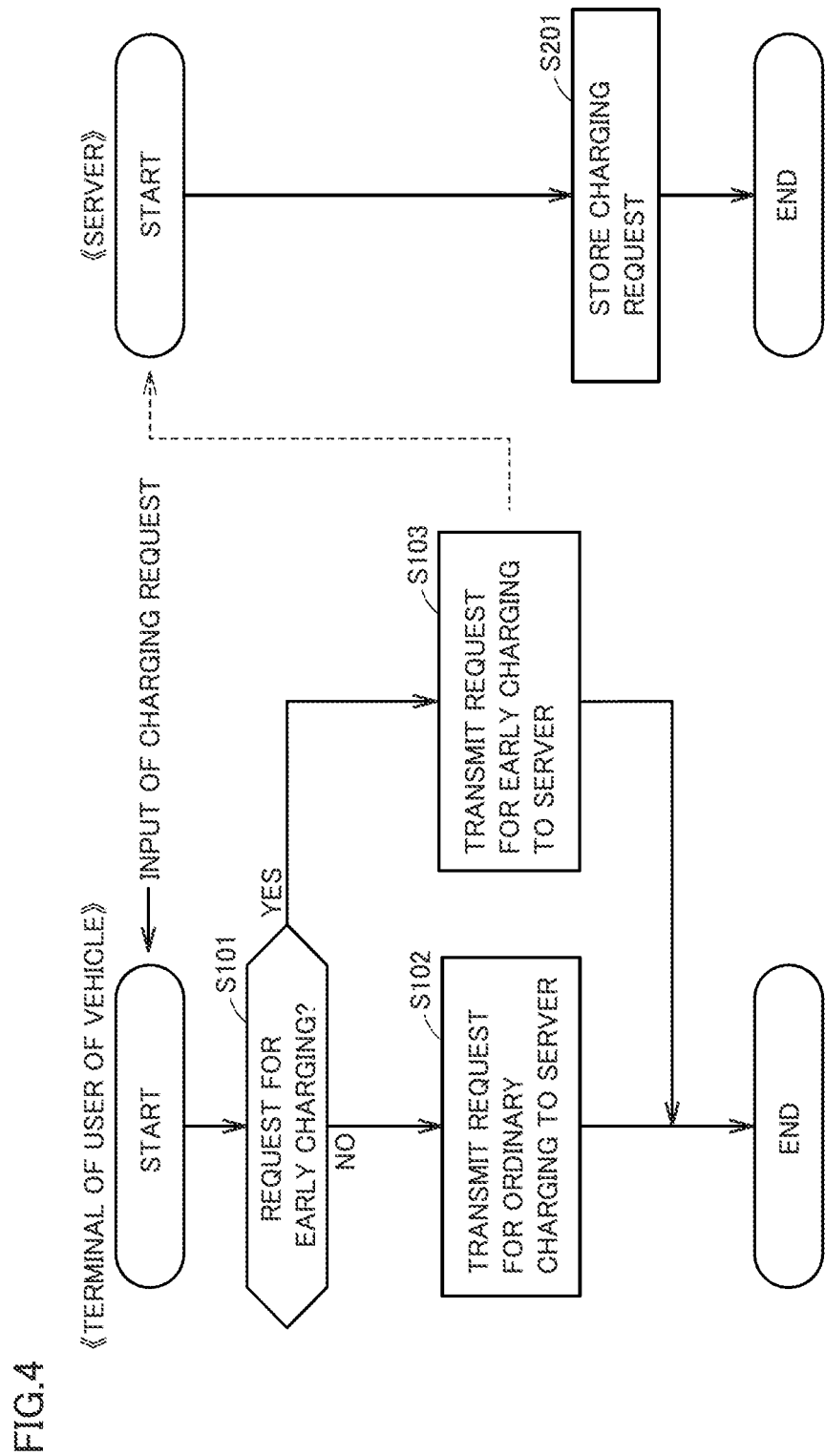
FIG. 4 is a flowchart for illustrating processing for transmitting a charging request from a terminal of a user of a vehicle to the server in the electric power system according to the embodiment of the present disclosure.

FIG. 4 is a flowchart for illustrating processing for transmitting a charging request from a terminal of a user of a vehicle to server 100. In connection with each step (which is simply denoted as "S" below) in FIG. 4, portable terminal 10 (FIG. 2) performs S101 to S103 and server 100 performs S201.

Referring to FIG. 4 together with FIGS. 1 and 2, when a charging request (a request for ordinary charging or early charging) is provided from the user of the vehicle to portable terminal 10, processing by portable terminal 10 is started and S101 is performed. The vehicle of the user can provide the charging request to portable terminal 10 by operating the touch panel display of portable terminal 10.

In S101, portable terminal 10 determines whether or not the charging request provided from the user of the vehicle is the request for early charging. When the provided charging request is the request for ordinary charging (NO in S101), in S102, the request for ordinary charging is transmitted from portable terminal 10 to server 100 together with the terminal ID. When the provided charging request is the request for early charging (YES in S101), in S103, the request for early charging is transmitted from portable terminal 10 to server 100 together with the terminal ID.

The terminal that performs S101 to S103 is not limited to portable terminal 10, and any terminal operated by the user of the vehicle is applicable. A terminal (for example, a car navigation system) mounted on the vehicle may perform S101 to S103.

When server 100 receives the charging request (the request for ordinary charging or early charging) from the terminal of the user of the vehicle (in this embodiment, portable terminal 10), server 100 performs processing in S201. In S201, information manager 117 of server 100 has the received charging request stored in storage 120 in association with the terminal ID. After processing in S201, server 100 performs processing shown in FIG. 5 which will be described below.

Figure 5:
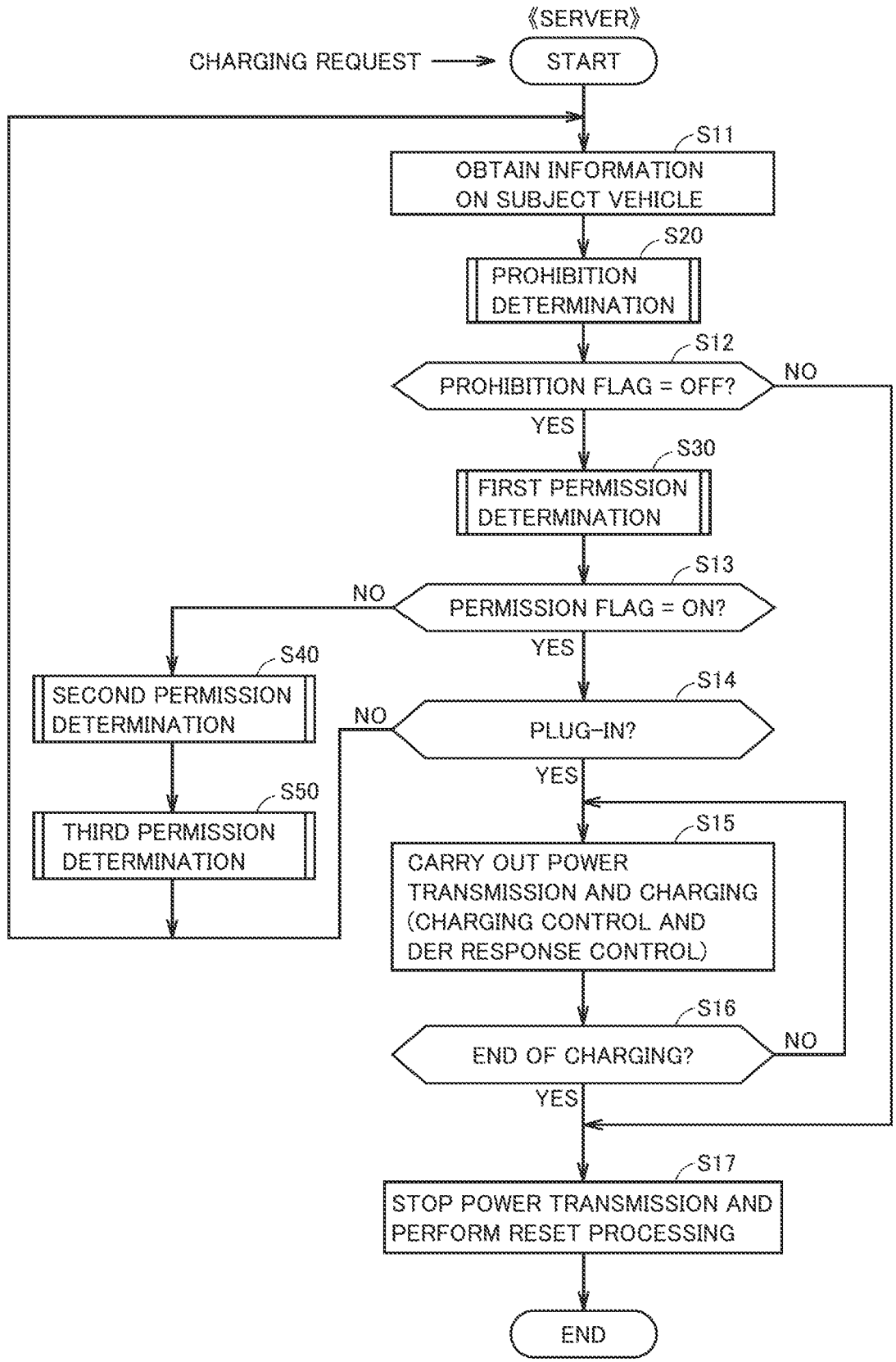
FIG. 5 is a flowchart showing charging-related processing performed by the server shown in FIG. 2.

FIG. 5 is a flowchart showing charging-related processing performed by server 100. Referring to FIG. 5 together with FIGS. 1 and 2, in S11, information manager 117 identifies the subject vehicle based on the terminal ID associated with the charging request stored in S201 in FIG. 4 and obtains information (for example, the specs, the position, the SOC, the permission flag, and the prohibition flag) of the subject vehicle by referring to the vehicle information within storage 120. Server 100 can identify a charging location based on the position of the subject vehicle. An initial value of each of the permission flag and the prohibition flag is OFF. The value of the prohibition flag is changed in processing in S20 which will be described later. A value of the permission flag is changed in processing in S30, S40, and S50 which will be described later.

Figure 6:
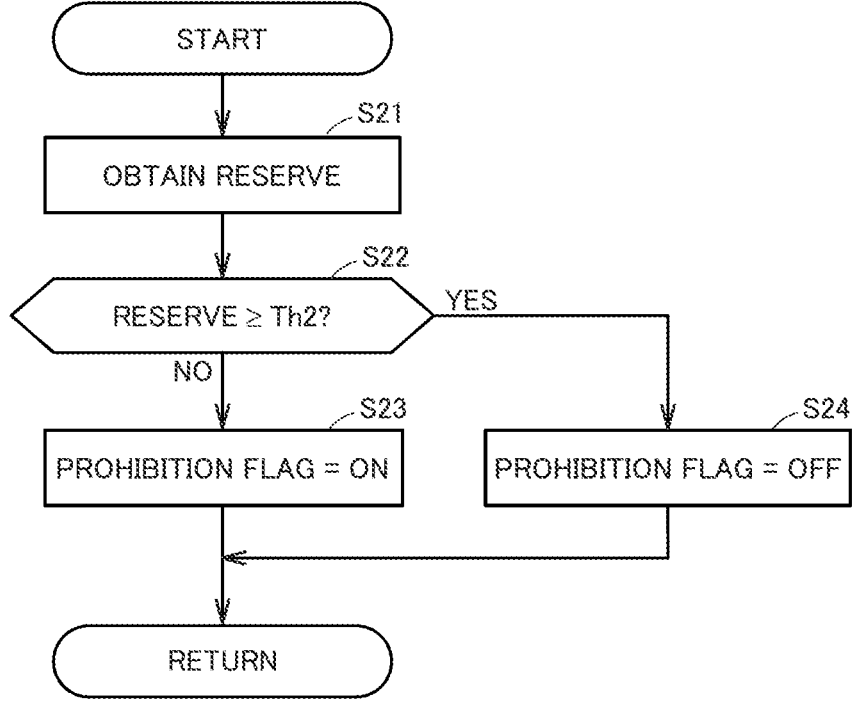
FIG. 6 is a flowchart showing processing involved with prohibition determination performed by the server shown in FIG. 2.

In S20, processing shown in FIG. 6 which will be described below is performed. FIG. 6 is a flowchart showing processing involved with prohibition determination performed by server 100. Referring to FIG. 6 together with FIGS. 1 and 2, in S21, third determination unit 116a obtains MG reserve (kW). Third determination unit 116a may obtain MG reserve based on the resource information (for example, reserve power generation capacity and reserve discharging capacity of DER group 500). In S22, third determination unit 116a determines whether MG reserve is not less than Th2. When MG reserve is smaller than Th2 (NO in S22), in S23, prohibition unit 116b sets the prohibition flag of the subject vehicle to ON. When MG reserve is not less than Th2 (YES in S22), in S24, prohibition unit 116b sets the prohibition flag of the subject vehicle to OFF. As processing in S23 or S24 is performed, the process proceeds to S12 in FIG. 5.

Referring again to FIG. 5 together with FIGS. 1 and 2, in S12, charging control unit 114 determines whether or not the prohibition flag of the subject vehicle is OFF. When the prohibition flag of the subject vehicle is OFF (YES in S12), the process proceeds to S30. When the prohibition flag of the subject vehicle is ON (NO in S12), a series of processing shown in FIG. 5 ends after S17 (reset processing) which will be described later. In other words, when the prohibition flag of the subject vehicle is ON, supply of electric power from microgrid MG to the subject vehicle is prohibited and subject charging is not carried out. When MG reserve is insufficient, microgrid MG tends to be unstable. As subject charging is prohibited in such a case, instability of microgrid MG due to vehicle charging is suppressed.

Figure 7:
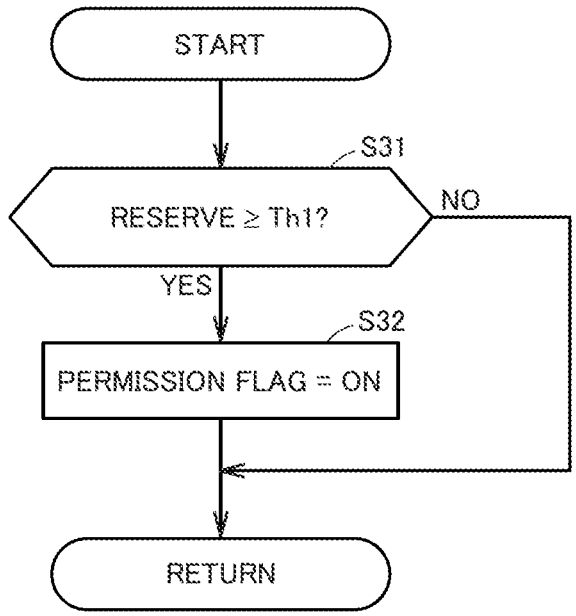
FIG. 7 is a flowchart showing processing involved with first permission determination performed by the server shown in FIG. 2.

In S30, processing shown in FIG. 7 which will be described below is performed. FIG. 7 is a flowchart showing processing involved with first permission determination performed by server 100. Referring to FIG. 7 together with FIGS. 1 and 2, in S31, first determination unit 111a determines whether MG reserve obtained in S21 in FIG. 6 is not less than Th1. When MG reserve is not less than Th1 (YES in S31), in S32, first permission unit 111b sets the permission flag of the subject vehicle to ON. Thereafter, the process proceeds to S13 in FIG. 5. When MG reserve is smaller than Th1 (NO in S31), the process proceeds to S13 in FIG. 5 with processing in S32 being skipped.

Referring again to FIG. 5 together with FIGS. 1 and 2, in S13, charging control unit 114 determines whether or not the permission flag of the subject vehicle is ON. When the permission flag is OFF (NO in S13), the process proceeds to S40. When the permission flag is ON (YES in S13), the process proceeds to S14.

Figure 8:
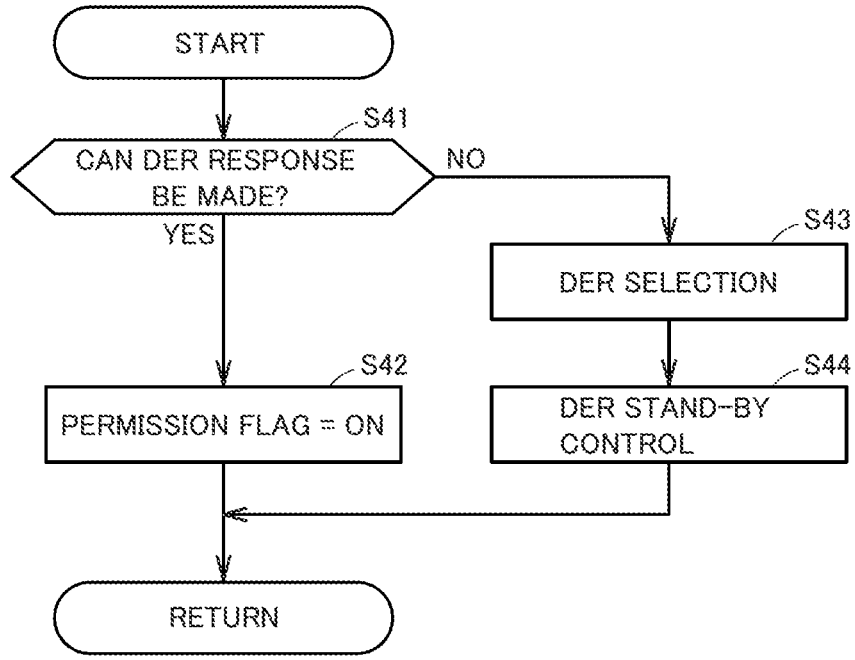
FIG. 8 is a flowchart showing processing involved with second permission determination performed by the server shown in FIG. 2.

In S40, processing shown in FIG. 8 which will be described below is performed. FIG. 8 is a flowchart showing processing involved with second permission determination performed by server 100. Referring to FIG. 8 together with FIGS. 1 and 2, in S41, second determination unit 112a determines whether or not electric power corresponding to charging power can be supplied from DER group 500 to microgrid MG by having at least one DER included in DER group 500 respond to subject charging. When determination as YES (electric power can be supplied) is made in S41, in S42, second permission unit 112b sets the permission flag of the subject vehicle to ON. When determination as NO (electric power cannot be supplied) is made in S41, in S43, resource control unit 115 selects at least one DER from DER group 500 in accordance with the priority shown in DER selection information (see FIG. 3). Resource control unit 115 selects a sufficient number of DERs such that electric power corresponding to charging power is supplied to microgrid MG by having the selected DERs respond to subject charging. Thereafter, in S44, DER stand-by control for the DERs selected in S43 is started. It takes some time from start of DER stand-by control until the selected DERs are set to the responsive state. When the processing in S42 or S44 is performed, a series of processing shown in FIG. 8 (S40 in FIG. 5) ends. Then, the process proceeds to S50 in FIG. 5.

Figure 9:
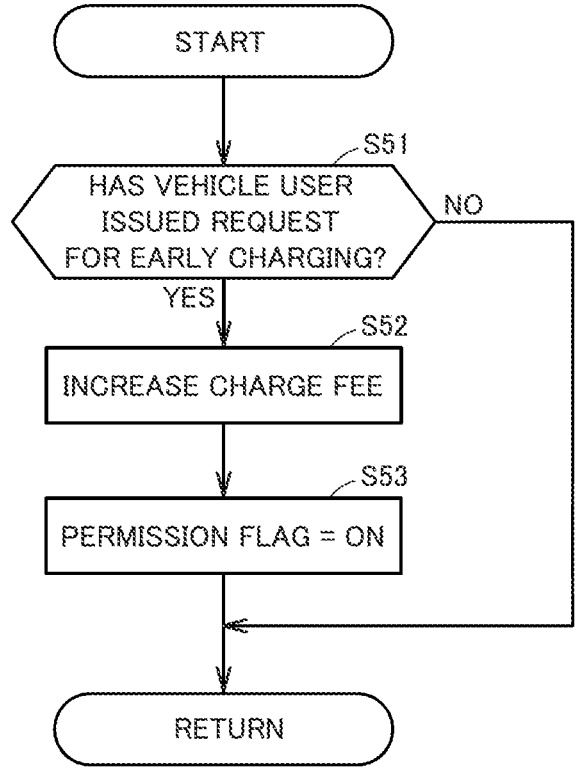
FIG. 9 is a flowchart showing processing involved with third permission determination performed by the server shown in FIG. 2.

In S50, processing shown in FIG. 9 described below is performed. FIG. 9 is a flowchart showing processing involved with third permission determination performed by server 100. Referring to FIG. 9 together with FIGS. 1 and 2, in S51, third permission unit 113 determines whether or not the charging request stored in S201 in FIG. 4 is the request for early charging.

When the charging request is the request for early charging (YES in S51), in S52, information manager 117 increases the unit price of the charge fee for subject charging. The unit price of the charge fee for early charging is thus higher than the unit price of the charge fee for each of first charging and second charging. An amount of increase (an amount of price rise) of the unit price of the charge fee in S52 may vary depending on stability (or balance between supply and demand) of microgrid MG. For example, when microgrid MG is insufficient in supply, the amount of price rise in S52 may be increased.

After processing in S52, in S53, third permission unit 113 sets the permission flag of the subject vehicle to ON. When determination as NO is made in S41 in FIG. 8 as well, third permission unit 113 sets the permission flag of the subject vehicle to ON without waiting until the DERs selected in S43 in FIG. 8 are set to the responsive state. Determination as YES is thus made in S13 in FIG. 5.

When the charging request is the request for ordinary charging (NO in S51), a series of processing shown in FIG. 9 (S50 in FIG. 5) ends. When the permission flag is maintained to OFF, determination in S41 in FIG. 8 is repeatedly made. DER stand-by control is continued in S44 in FIG. 8. When DER stand-by control is completed and determination as YES (electric power can be supplied) is made in S41 in FIG. 8, in S42 in FIG. 8, second permission unit 112b sets the permission flag of the subject vehicle to ON. Determination as YES is thus made in S13 in FIG. 5.

Referring again to FIG. 5 together with FIGS. 1 and 2, when determination as YES (the permission flag of the subject vehicle=ON) is made in S13, in S14, charging control unit 114 determines whether or not the charging connector of EVSE 20 (for example, EVSE 20 for which user authentication was carried out) is connected to the inlet of the subject vehicle. When EVSE 20 and the subject vehicle have already electrically been connected to each other, determination as YES is made in S14 and the process proceeds to S15. When EVSE 20 and the subject vehicle are not electrically connected to each other, determination as NO is made in S14. While determination as NO is made in S14, S11 to S14 are repeatedly performed. When the charging connector of EVSE 20 is inserted into the inlet of the subject vehicle (YES in S14), charging immediately after plug-in is carried out in processing in S15 which will be described below.

In S15, charging control unit 114 carries out charging control for adjusting charging power to be supplied from microgrid MG to the subject vehicle and DER response control for supplying electric power corresponding to charging power from DER group 500 to microgrid MG. Charging control and DER response control are basically carried out to achieve balancing of microgrid MG.

In each of first charging and third charging (early charging), responsiveness of DER group 500 may be insufficient at the time point of start of charging. Then, charging control unit 114 controls rise of charging power in accordance with responsiveness of DER group 500 (more specifically, responsiveness of a DER that responds to subject charging). Since MG reserve is sufficiently large in first charging, microgrid MG is less likely to be unstable than in third charging (early charging).

Figure 10:
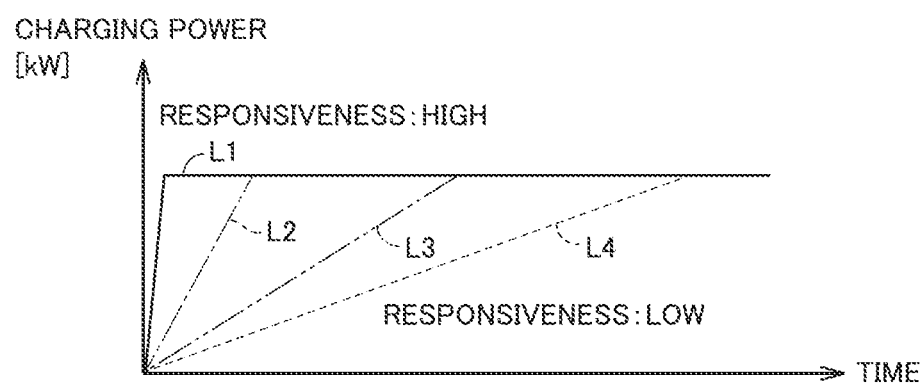
FIG. 10 is a diagram for illustrating control of rise of charging power carried out by the server shown in FIG. 2.

FIG. 10 is a diagram for illustrating control of rise of charging power carried out by charging control unit 114. Referring to FIG. 10, when responsiveness of DER group 500 is sufficient, a gradient of rise of charging power is set to be steep as shown with a line L1. When responsiveness of DER group 500 is insufficient, the gradient of rise of charging power is set to be gentle (see lines L2 to L4). As the gradient of rise of charging power is gentler, microgrid MG is more likely to be stable. Among lines L1 to L4, line L4 exhibits the gentlest gradient of rise. Charging control unit 114 may switch among lines L1 to L4 in accordance with responsiveness of DER group 500, or may continuously vary the gradient of rise of charging power in accordance with responsiveness of DER group 500.

In second charging, priority is placed on stabilization of microgrid MG, and charging is started after responsiveness of DER group 500 becomes sufficiently high. In third charging (early charging), priority may be placed on early rise of charging power even though microgrid MG becomes somewhat unstable. When responsiveness of DER group 500 is insufficient, in DER response control described previously, charging controller 114 carries out response control for subject charging, and selects a DER and carries out DER stand-by control to increase DERs in the stand-by state. By setting the DER high in responsiveness to the stand-by state, responsiveness of DER group 500 is improved. Charging control unit 114 may carry out charging control such that an inclination of charging power is steeper with improvement in responsiveness of DER group 500.

Referring again to FIG. 5 together with FIGS. 1 and 2, charging control unit 114 may carry out charging control in S15 by remotely controlling the power conversion circuit (FIG. 2) mounted on the subject vehicle. Server 100 may directly wirelessly communicate with the subject vehicle or establish wired communication with the subject vehicle through EVSE 20 in order to remotely control the power conversion circuit of the subject vehicle. Wireless communication between server 100 and the subject vehicle may be established through a data communication module (DCM) mounted on the subject vehicle. Server 100 may issue a charging command to EVSE 20 and EVSE 20 may control the power conversion circuit of the subject vehicle in accordance with the command from server 100. Charging control unit 114 may carry out charging control in S15 by remotely controlling the power conversion circuit (FIG. 2) mounted on EVSE 20.

In S16, charging control unit 114 determines whether or not subject charging has ended. More specifically, charging control unit 114 determines whether or not a prescribed charging quitting condition has been satisfied. The charging quitting condition may be satisfied when the SOC of the power storage to be charged is equal to or higher than a prescribed SOC value (for example, an SOC value indicating full charge). Alternatively, the charging quitting condition may be satisfied when server 100 receives a request to quit charging from the subject vehicle or EVSE 20.

When determination as NO (charging quitting condition=not satisfied) is made in S16, the process returns to S15, and charging control and DER response control are continued in S15. When determination as YES (the charging quitting condition=satisfied) is made in S16, in S17, charging control unit 114 stops power transmission from microgrid MG to the subject vehicle. Subject charging thus ends. In S17, charging control unit 114 performs prescribed reset processing. In reset processing, a parameter (for example, the prohibition flag, the permission flag, and the unit price of the charge fee) temporarily changed in present charging is set back to the initial value. Then, as processing in S17 is performed, a series of processing in FIG. 5 ends.

As described above, the power management method according to this embodiment is a method of managing supply and demand of microgrid MG by using a plurality of DERs electrically connectable to microgrid MG, and it includes S31 (first determination) and S32 (first permission) shown in FIG. 7 and S41 (second determination) and S42 (second permission) shown in FIG. 8. In S31, server 100 determines whether reserve of microgrid MG is not less than the first reference value (Th1) before the subject vehicle (for example, BEV 11) including the power storage starts charging of the power storage by using microgrid MG. When reserve of microgrid MG is determined as being not less than the first reference value in S31, in S32, server 100 permits supply of electric power from microgrid MG to the subject vehicle. When reserve of microgrid MG is determined as being smaller than the first reference value in S31, in S41, server 100 determines whether or not electric power corresponding to charging power can be supplied to microgrid MG by having at least one DER included in DER group 500 respond to charging of the power storage.

When determination as YES (electric power can be supplied) is made in S41, in S42, server 100 permits supply of electric power from microgrid MG to the subject vehicle. When vehicle charging is started by permission (second permission) in S42, electric power corresponding to charging power can be supplied to microgrid MG by having at least one DER respond to vehicle charging. Therefore, according to the method, instability of microgrid MG (instability of the grid) due to vehicle charging is suppressed. When reserve of microgrid MG is sufficiently large, microgrid MG is less likely to be unstable. In such a case, the user of the vehicle can carry out vehicle charging early by permission (first permission) in S32.

Figure 11:
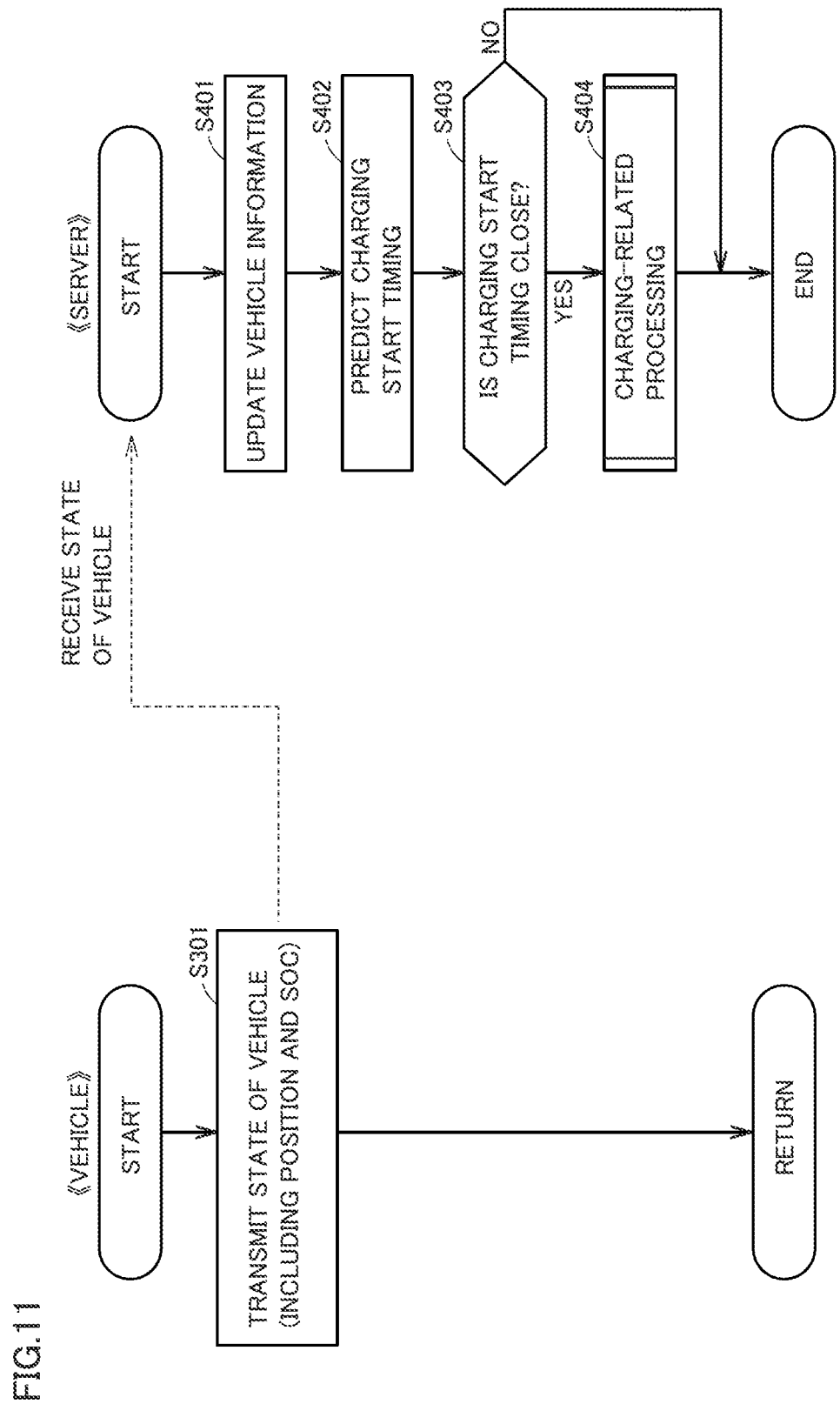
FIG. 11 is a diagram showing a first modification of processing shown in FIG. 4.

Though an example in which vehicle charging is carried out in public EVSE is described in the embodiment, the charging-related processing shown in FIG. 5 may be performed in vehicle charging by using home EVSE. In the embodiment, the charging-related processing shown in FIG. 5 is started when server 100 receives the charging request. Timing to start the charging-related processing shown in FIG. 5, however, can be varied as appropriate. FIG. 11 is a diagram showing a first modification of the processing shown in FIG. 4. In FIG. 11, the ECU of each vehicle chargeable by EVSE 20 performs S301, and server 100 performs S401 to S404. In this modification, instead of the processing shown in FIG. 4, processing shown in FIG. 11 which will be described below is performed.

Referring to FIG. 11 together with FIGS. 1 and 2, in S301, the ECU of the vehicle (for example, ECU 11a of BEV 11 shown in FIG. 1) obtains the current state of the vehicle (including the position and the SOC) with various sensors mounted on the vehicle and transmits the obtained state of the vehicle to server 100 together with the vehicle 1D. The ECU may detect the position of the vehicle by using a global positioning system (GPS) module of the car navigation system mounted on the vehicle. For example, such a known approach as a current integration method or an OCV estimation method can be adopted as a method of measuring the SOC. Processing in S301 is repeatedly performed, for example, in prescribed cycles.

When server 100 receives the state of the vehicle from the vehicle, it performs processing in S401. In S401, information manager 117 of server 100 has the received state of the vehicle stored in storage 120. The vehicle information in storage 120 is thus updated.

Figure 12:
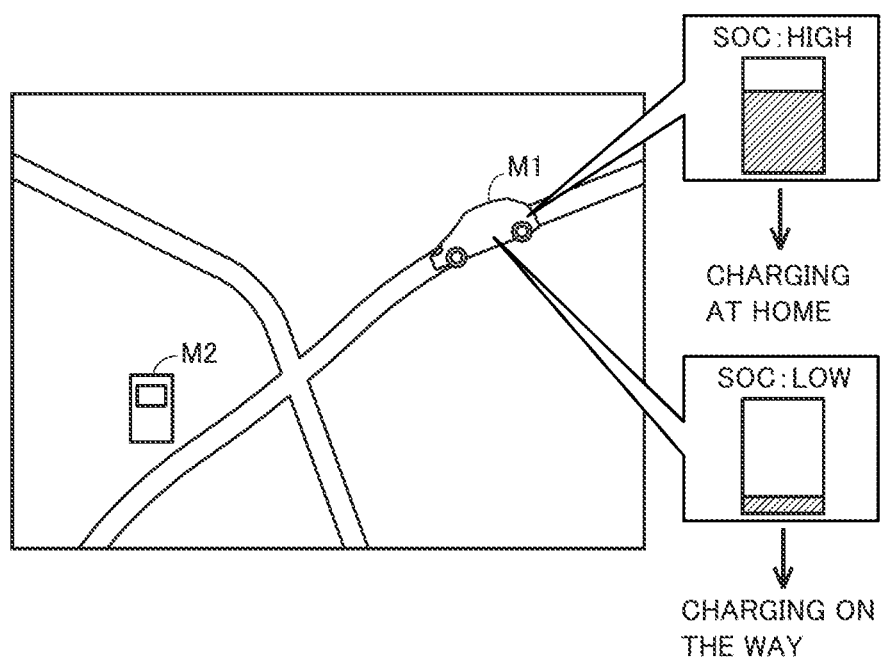
FIG. 12 is a diagram for illustrating a method of predicting charging start timing in the modification shown in FIG. 11.

In S402, first determination unit 111a predicts charging start timing based on the position of the vehicle obtained in S401 and the SOC (remaining power in the power storage). FIG. 12 is a diagram for illustrating a method of predicting charging start timing.

Referring to FIG. 12, for example, when the destination of a vehicle M1 is the user's home, first determination unit 111a determines whether or not vehicle M1 can reach the home without charging the vehicle-mounted battery on the way, based on the position of vehicle M1 and the SOC of the vehicle-mounted battery. Then, when it is determined that vehicle M1 can reach the home without charging, first determination unit 111a estimates that a next charging location is the user's home (home EVSE) and predicts time of arrival of vehicle M1 at home as the charging start timing. When it is determined that vehicle M1 is unable to reach the home without charging of the vehicle-mounted battery on the way, first determination unit 111a estimates EVSE 20 (for example, EVSE M2 in FIG. 12) present between vehicle M1 and the home as a next charging location and predicts time of arrival of vehicle M1 at that EVSE 20 as the charging start timing. First determination unit 111a may estimate EVSE 20 closest to the vehicle on a route to home as the next charging location, for example, at the time point when the SOC of the vehicle-mounted battery is equal to or smaller than a prescribed SOC value.

Referring again to FIG. 11 together with FIGS. 1 and 2, in S403, first determination unit 111a determines whether or not the charging start timing predicted in S402 is close. For example, when a difference between the current time and the charging start timing is within a prescribed time period, first determination unit 111a makes determination as YES (close) in S403. Alternatively, first determination unit 111a may make determination as YES (close) in S403 when the vehicle enters a range within a prescribed distance from the next charging location estimated in S402.

While determination as NO (not being close) is made in S403, server 100 performs processing in S401 to S403 each time server 100 receives the state of the vehicle from the vehicle. When determination as YES (being close) is made in S403, in S404, server 100 performs the charging-related processing shown in FIG. 5. In this modification, the vehicle for which determination as YES is made in S403 is defined as the subject vehicle.

As in the modification described above, timing to start the charging-related processing (including first permission determination) shown in FIG. 5 may be determined based on charging start timing predicted by first determination unit 111a. First determination unit 111a may predict charging start timing in consideration also of the action schedule of the vehicle in addition to the position and the SOC of the vehicle. First determination unit 111a may predict an action of the vehicle based on accumulated position data (history data) of the vehicle.

Figure 13:
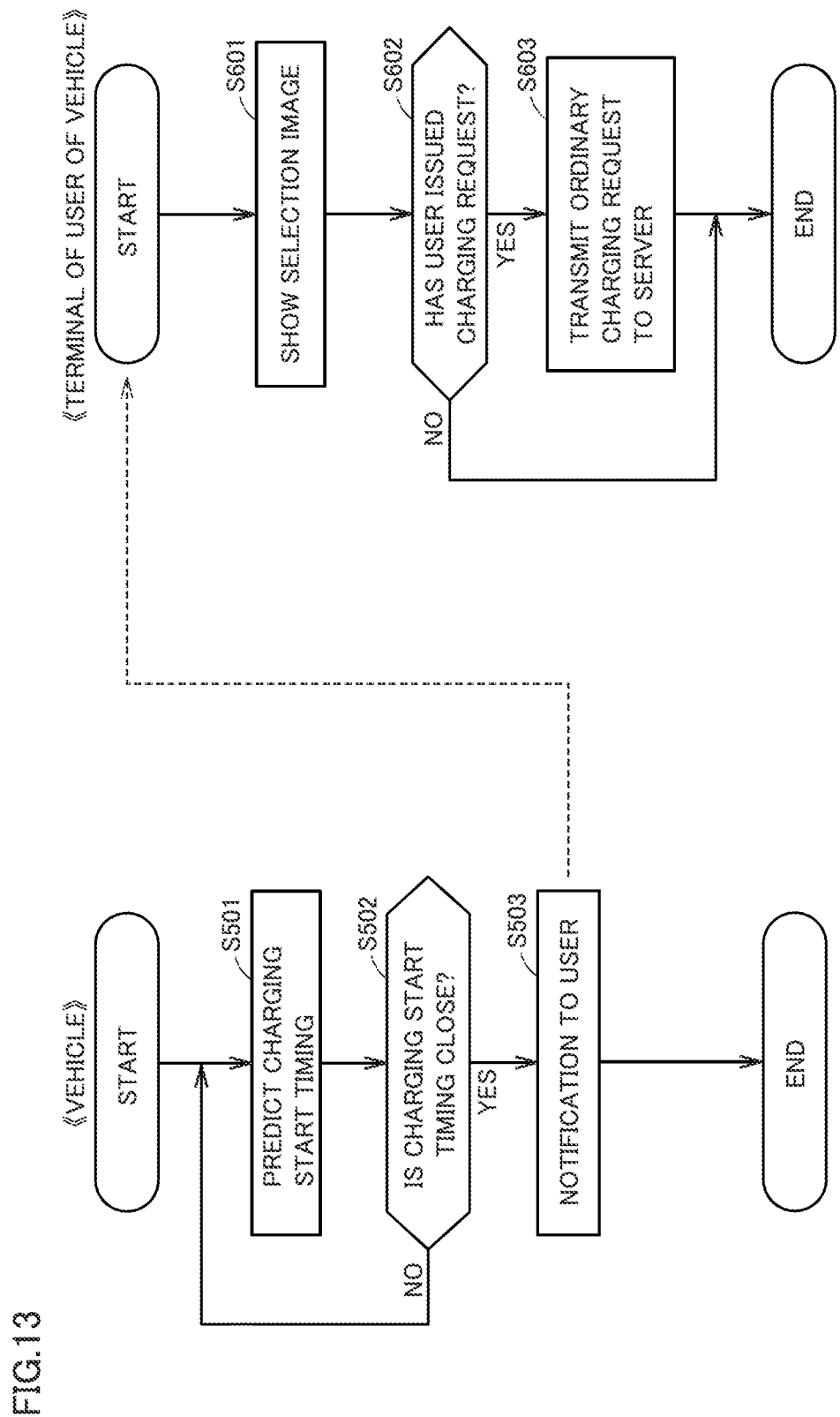
FIG. 13 is a diagram showing a second modification of the processing shown in FIG. 4.

When the ECU in the vehicle predicts charging start timing and the predicted charging start timing is close, the ECU may invite the user to issue a charging request. FIG. 13 is a diagram showing a second modification of the processing shown in FIG. 4. In FIG. 13, the ECU of each vehicle chargeable by EVSE 20 performs S501 to S503 and portable terminal 10 (FIG. 2) performs S601 to S603. In this modification, processing shown in FIG. 13 which will be described below is performed instead of the processing shown in FIG. 4.

Referring to FIG. 13 together with FIGS. 1 and 2, in S501, the ECU of the vehicle (for example, ECU 11a of BEV 11 shown in FIG. 1) predicts charging start timing, and in S502, the ECU determines whether or not the charging start timing is close. Processing in S501 and S502 is similar to processing in S402 and S403 in FIG. 11 described previously. When determination as YES (being close) is made in S502, in S503, the ECU gives a prescribed notification to the user of the vehicle. More specifically, the ECU transmits to portable terminal 10, a signal indicating that the charging start timing is close. The ECU and portable terminal 10 may exchange information with each other through short-range communication such as Bluetooth® (for example, direct communication in a vehicle or within an area around the vehicle).

When portable terminal 10 receives the notification (S503) from the ECU, it performs processing in S601. In S601, portable terminal 10 shows a selection screen on the touch panel display. The selection screen requests the user of the vehicle to select whether or not to transmit a charging request to a terminal (server 100) of the MG manager.

Figure 14:
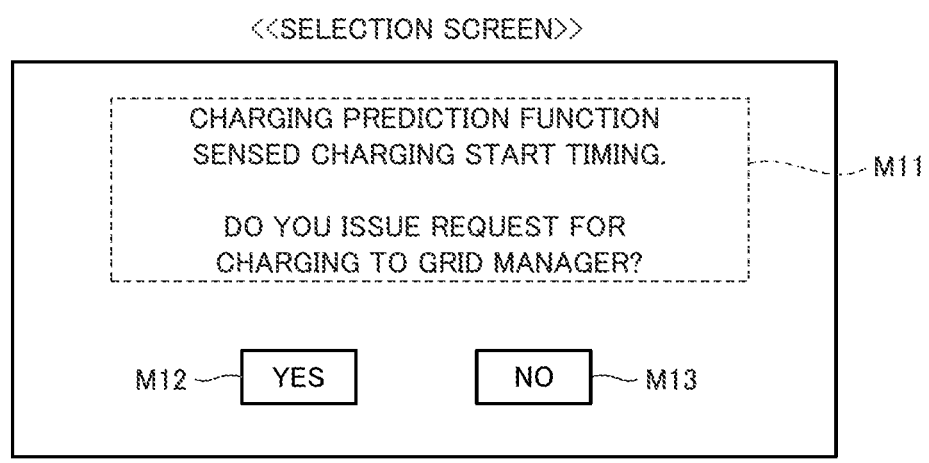
FIG. 14 is a diagram showing an exemplary selection screen used in processing shown in FIG. 13.

FIG. 14 is a diagram showing an exemplary selection screen. Referring to FIG. 14, this selection screen includes a message M11, a "YES" button M12, and a "NO" button M13. Message M11 requests the user of the vehicle to select whether or not to issue the charging request. Referring to FIG. 13 together with FIG. 14, in S602, portable terminal 10 determines which of "YES" button M12 and "NO" button M13 has been operated by the user of the vehicle. When the user of the vehicle has pressed "YES" button M12, determination as YES is made in S602. Pressing of "YES" button M12 by the user of the vehicle means input of the charging request from the user of the vehicle to portable terminal 10. When the user of the vehicle has pressed "NO" button M13, determination as NO is made in S602.

Referring again to FIG. 13 together with FIGS. 1 and 2, when determination as YES is made in S602, in S603, a request for ordinary charging is transmitted from portable terminal 10 to server 100 together with the terminal ID. When server 100 receives the request for ordinary charging from portable terminal 10, it performs the charging-related processing shown in FIG. 5. When determination as NO is made in S602, a series of processing shown in FIG. 13 ends with processing in S603 being skipped.

The ECU may invite the user of the vehicle to issue a charging request at prescribed timing as in the modification described above. Then, the charging-related processing shown in FIG. 5 may be started when server 100 receives the charging request from the user of the vehicle.

Figure 15:
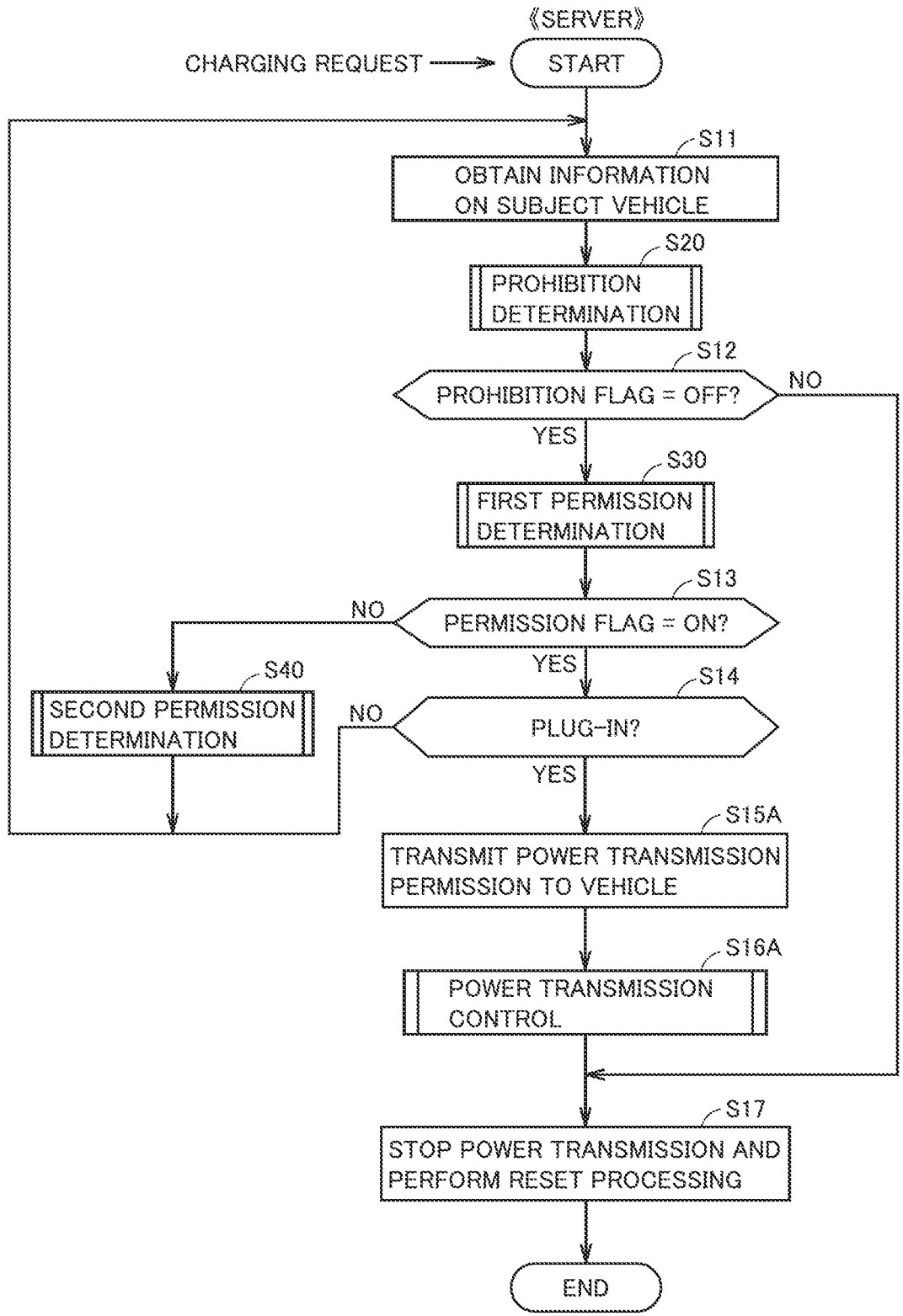
FIG. 15 is a diagram showing a modification of processing shown in FIG. 5.

In the embodiment, server 100 carries out charging control under remote control. The ECU of the subject vehicle, however, may carry out charging control without being limited as such. FIG. 15 is a diagram showing a modification of the processing shown in FIG. 5. Processing shown in FIG. 15 is the same as the processing shown in FIG. 5 except that S50 (FIG. 5) is not performed and S15A and S16A are adopted instead of S15 and S16 (FIG. 5). S15A and S16A will be described below.

In S15A, server 100 transmits power transmission permission to the subject vehicle. Power transmission permission is a signal indicating permission of power transmission. Thereafter, in S16A, server 100 performs processing shown in FIG. 16 which will be described below. The subject vehicle also performs processing shown in FIG. 16 when it receives power transmission permission.

Figure 16:
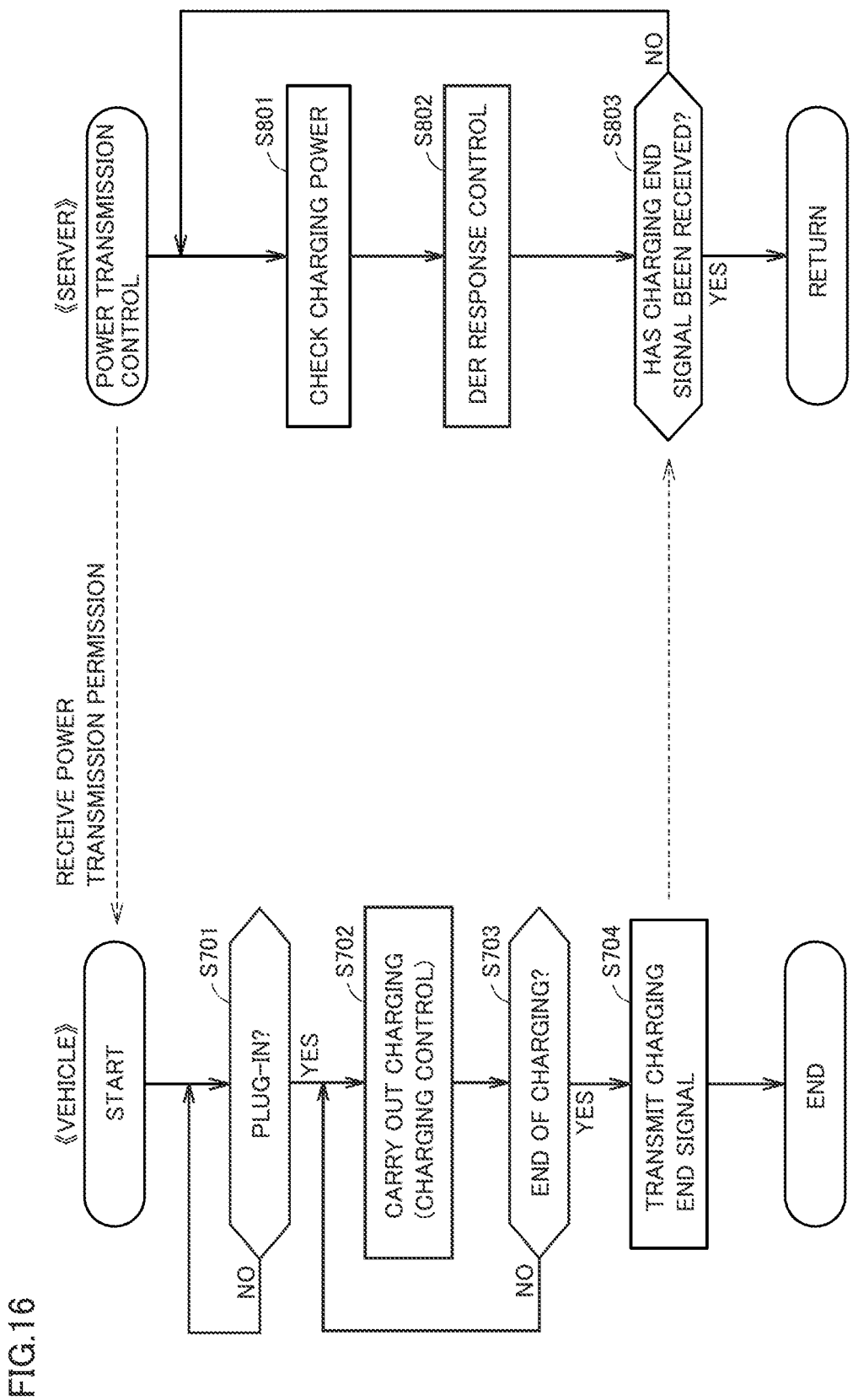
FIG. 16 is a flowchart for illustrating charging control and DER response control according to the modification shown in FIG. 15.

FIG. 16 is a flowchart for illustrating charging control and DER response control according to the modification.

Referring to FIG. 16 together with FIGS. 1 and 2, when the subject vehicle receives power transmission permission (S15A in FIG. 15), it performs processing in S701. In S701, the ECU of the subject vehicle determines whether or not the charging connector of EVSE 20 is connected to the inlet of the subject vehicle. When EVSE 20 and the subject vehicle have already electrically been connected to each other, determination as YES is made in S701 and the process proceeds to S702. When EVSE 20 and the subject vehicle are not electrically connected to each other, determination as NO is made in S701. While determination as NO is made in S701, determination in S701 is repeatedly made. When the charging connector of EVSE 20 is inserted into the inlet of the subject vehicle, charging immediately after plug-in is carried out in processing in S702 which will be described below.

In S702, the ECU carries out subject charging (charging of the power storage mounted on the subject vehicle) with electric power supplied from microgrid MG through EVSE 20 to the subject vehicle. The ECU may maintain charging power constant or vary charging power depending on a state of the power storage. The ECU can adjust charging power by controlling the charger (power conversion circuit) mounted on the subject vehicle.

In S703, the ECU determines whether or not subject charging has ended. More specifically, the ECU determines whether or not a prescribed charging quitting condition is satisfied. The charging quitting condition may be satisfied when the SOC of the power storage to be charged is equal to or higher than a prescribed SOC value (for example, an SOC value indicating full charge). The charging quitting condition may be satisfied when the ECU receives a request to quit charging from the user.

When determination as NO (charging quitting condition=not satisfied) is made in S703, the process returns to S702 and subject charging is continued. When determination as YES (the charging quitting condition=satisfied) is made in S703, in S704, the ECU transmits a charging end signal to server 100. The charging end signal is a signal indicating end of subject charging. Then, as processing in S704 is performed, processing in the subject vehicle ends.

When server 100 transmits power transmission permission (S15A in FIG. 15) to the subject vehicle, it performs processing in S801 and S802. Specifically, in S801, charging control unit 114 checks charging power, and in S802, charging control unit 114 carries out DER response control. Charging control unit 114 may obtain charging power from EVSE 20 connected to the subject vehicle. Under DER response control, electric power corresponding to charging power is supplied from DER group 500 to microgrid MG. DER response control is carried out to achieve balancing of microgrid MG.

In S803, charging control unit 114 determines whether or not it has received the charging end signal (S704) from the subject vehicle. During charging (NO in S803), S801 to S803 are repeated. When server 100 receives the charging end signal from the subject vehicle (YES in S803), the process returns to the flow in FIG. 15 and server 100 performs processing in S17.

As in the modification described above, the subject vehicle itself may carry out charging control without relying on remote control by server 100.

Server 100 may control DER group 500 in coordination with another server. DERs included in DER group 500 may be grouped and a server (for example, a server that manages DERs within the group) may be provided for each group. For example, a server that controls an EMS may be provided for each EMS. Then, server 100 may control DER group 500 through the server for each group.

The configuration of the vehicle adopted as the power adjustment resource is not limited to the configuration shown in the embodiment. For example, it is not essential that the vehicle includes the communication apparatus for wireless communication with server 100. A plug-in hybrid vehicle (PHV) may be adopted as the power adjustment resource. The vehicle may be configured to be wirelessly chargeable. Subject charging may be wireless charging. The vehicle is not limited to a passenger car, and a bus or a truck may be applicable. The vehicle may be an autonomous vehicle or may perform a flying function. The vehicle may be a vehicle that can travel without human intervention (for example, an automated guided vehicle (AGV) or an agricultural implement).

The power adjustment resource is not limited to the DER shown in FIG. 1. For example, an induction generator with a flywheel may be adopted as the power adjustment resource.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A server that manages a plurality of power adjustment resources electrically connectable to a power network, the server comprising:
   a first determination unit that determines whether reserve of the power network is not less than a first reference value before a vehicle including a power storage starts charging of the power storage by using the power network;
   a first permission unit that permits supply of electric power from the power network to the vehicle when the first determination unit determines that reserve of the power network is not less than the first reference value;
   a second determination unit that determines whether electric power corresponding to charging power can be supplied to the power network by having at least one of the power adjustment resources respond to charging of the power storage when the first determination unit determines that reserve of the power network is smaller than the first reference value; and
   a second permission unit that permits supply of electric power from the power network to the vehicle when the second determination unit determines that electric power can be supplied.

2. The server according to claim 1, further comprising a third permission unit that permits supply of electric power from the power network to the vehicle upon receiving a request for early charging from a terminal of a user of the vehicle before the vehicle starts charging of the power storage by using the power network.

3. The server according to claim 2, further comprising a fee manager that manages a fee for charging, wherein
   the fee manager sets a fee for charging started by permission by the third permission unit to be higher than a fee for charging started by permission by each of the first permission unit and the second permission unit.

4. The server according to claim 1, further comprising:
   a third determination unit that determines whether reserve of the power network is not less than a second reference value smaller than the first reference value before the vehicle starts charging of the power storage by using the power network; and
   a prohibition unit that prohibits supply of electric power from the power network to the vehicle when the third determination unit determines that reserve of the power network is smaller than the second reference value.

5. The server according to claim 1, further comprising a resource control unit that
   selects at least one power adjustment resource from among the plurality of power adjustment resources when the second determination unit determines that electric power cannot be supplied, and
   controls the selected power adjustment resource to be in a state responsive to charging of the power storage.

6. The server according to claim 5, wherein
   the plurality of power adjustment resources include a stationary power storage and a fuel cell electric vehicle, and
   the resource control unit preferentially selects the stationary power storage over the fuel cell electric vehicle.

7. The server according to claim 6, further comprising an incentive manager that manages an incentive given to a user of a power adjustment resource that has made power adjustment of the power network, wherein
   the incentive manager sets an incentive for power adjustment by using the fuel cell electric vehicle to be higher than an incentive for power adjustment by using the stationary power storage.

8. The server according to claim 1, further comprising a charging control unit that starts charging of the power storage when the power network and the vehicle are electrically connected to each other while supply of electric power from the power network to the vehicle is permitted and controls charging power for the power storage during charging.

9. The server according to claim 8, wherein
   the charging control unit carries out control of rise of charging power for the power storage in accordance with responsiveness of the power adjustment resource that responds to charging of the power storage.

10. The server according to claim 1, wherein
    when the first determination unit receives a charging request from a terminal of a user of the vehicle, the first determination unit determines whether reserve of the power network is not less than the first reference value.

11. The server according to claim 1, further comprising a vehicle manager that manages information on the vehicle, wherein
    the information managed by the vehicle manager includes at least one of a position of the vehicle and remaining power in the power storage, and
    the first determination unit predicts charging start timing based on at least one of the position of the vehicle and the remaining power in the power storage.

12. A method of managing supply and demand of a power network by using a plurality of power adjustment resources electrically connectable to the power network, the method comprising:
- making first determination to determine whether reserve of the power network is not less than a first reference value before a vehicle including a power storage starts charging of the power storage by using the power network;
- giving first permission to permit supply of electric power from the power network to the vehicle when it is determined in the first determination that reserve of the power network is not less than the first reference value;
- making second determination to determine whether electric power corresponding to charging power can be supplied to the power network by having at least one of the power adjustment resources respond to charging of the power storage when it is determined in the first determination that reserve of the power network is smaller than the first reference value; and
- giving second permission to permit supply of electric power from the power network to the vehicle when it is determined in the second determination that electric power can be supplied.

* * * * *